US011965587B2

(12) United States Patent
Deng

(10) Patent No.: US 11,965,587 B2
(45) Date of Patent: Apr. 23, 2024

(54) VEHICLE AND AXLE THEREOF

(71) Applicant: SEGWAY TECHNOLOGY CO., LTD., Changzhou (CN)

(72) Inventor: Zhengchang Deng, Changzhou (CN)

(73) Assignee: SEGWAY TECHNOLOGY CO., LTD., Changzhou (CN)

( * ) Notice: Subject to any disclaimer, the term of this patent is extended or adjusted under 35 U.S.C. 154(b) by 29 days.

(21) Appl. No.: 17/763,729

(22) PCT Filed: Sep. 27, 2020

(86) PCT No.: PCT/CN2020/118050
§ 371 (c)(1),
(2) Date: Mar. 25, 2022

(87) PCT Pub. No.: WO2021/057958
PCT Pub. Date: Apr. 1, 2021

(65) Prior Publication Data
US 2022/0316571 A1    Oct. 6, 2022

(30) Foreign Application Priority Data

Sep. 27, 2019  (CN) .......................... 201921639494.2

(51) Int. Cl.
*F16H 48/40* (2012.01)
*F16H 48/08* (2006.01)
(Continued)

(52) U.S. Cl.
CPC ............. *F16H 48/40* (2013.01); *F16H 48/08* (2013.01); *F16H 48/16* (2013.01); *F16H 2048/202* (2013.01); *F16H 2048/346* (2013.01)

(58) Field of Classification Search
CPC ......... F16H 2048/202; F16H 2048/346; F16H 48/08–11; F16H 48/16; F16H 48/20–2048/426; F16D 27/10–14
See application file for complete search history.

(56) References Cited

U.S. PATENT DOCUMENTS 3,388,779 A * 6/1968 Roper .................... F16H 48/08
475/85
6,193,041 B1 * 2/2001 Takahashi ............... F16D 28/00
192/84.961
(Continued)

FOREIGN PATENT DOCUMENTS

CN          105190104 A       12/2015
CN          210920009 U        7/2020
(Continued)

OTHER PUBLICATIONS

International Search Report and Written Opinion dated Dec. 30, 2020 for Application No. PCT/CN2020/118050, 24 pages.

*Primary Examiner* — Ernesto A Suarez
*Assistant Examiner* — James J Taylor, II
(74) *Attorney, Agent, or Firm* — Frost Brown Todd LLP

(57) ABSTRACT

An axle includes: a driven disc, an inner peripheral surface of the driven disc being a first contact surface; a half shaft connector in transmission with the driven disc, the half shaft connector including a second contact surface on its outer periphery, one of the first contact surface and the second contact surface being a circular ring surface, and the other thereof being a polygonal surface; and a differential lock device including rolling members, a rolling holder, a switching driving member, a switching driven member and a second elastic reset mechanism, a plurality of rolling members being arranged in one-to-one correspondence with a plurality of faces of the polygonal surface, and the switching driving member selectively driving the switching driven member to move, to make the rolling members move to an engaged position.

18 Claims, 9 Drawing Sheets

(51) Int. Cl.
  *F16H 48/20* (2012.01)
  *F16H 48/34* (2012.01)
  *F16H 48/16* (2006.01)

(56) References Cited

U.S. PATENT DOCUMENTS

| | | | |
|---|---|---|---|
| 6,595,337 B2 * | 7/2003 | Goto | F16D 41/04 |
| | | | 192/84.8 |
| 6,622,837 B2 | 9/2003 | Ochab et al. | |
| 6,702,708 B2 | 3/2004 | Goto et al. | |
| 6,766,888 B2 | 7/2004 | Yasui et al. | |
| 6,769,524 B2 | 8/2004 | Yasui et al. | |
| 7,654,934 B2 * | 2/2010 | Alfredson | F16H 48/295 |
| | | | 477/35 |
| 7,938,041 B1 | 5/2011 | Shiigi et al. | |
| 8,857,294 B2 * | 10/2014 | Brewer | F16D 27/10 |
| | | | 192/38 |
| 10,830,291 B2 | 11/2020 | Fukuda | |

FOREIGN PATENT DOCUMENTS

| | | |
|---|---|---|
| CN | 210920012 U | 7/2020 |
| CN | 211525470 U | 9/2020 |

\* cited by examiner

VEHICLE AND AXLE THEREOF

CROSS-REFERENCE TO RELATED APPLICATIONS

This application a national phase entry under 35 USC § 371 of International Application PCT/CN2020/118050, filed on Sep. 27, 2020, which claims priority to Chinese Patent Application No. 201921639494.2, titled "Vehicle and Axle Thereof" and filed on Sep. 27, 2019, the entire contents of which are incorporated herein by reference.

FIELD

The present disclosure relates to the technical field of vehicles and, more particularly, to a vehicle and an axle thereof.

BACKGROUND

In the related art, an axle of a vehicle generally includes a planetary differential structure. In order to avoid slipping of the vehicle when steering, the planetary differential structure is generally equipped with a differential lock. However, the differential lock has a tendency to abutting against teeth or jamming (an engagement mode by a spline or a pawl and the like) when engaged and disengaged, which may result in poor driveability and poor driving experience of a driver.

SUMMARY

An axle of the vehicle according to the present disclosure includes: a driving gear; a driven disc including a driven gear meshing with the driving gear, the driven disc being hollow inside, an inner peripheral surface of the driven disc being a first contact surface, and a planetary driving gear being arranged in the driven disc; two half shaft connectors arranged inside the driven disc and spaced apart in an axial direction, each of the half shaft connectors including a planetary driven gear, two planetary driven gears meshing with the planetary driving gear on two sides of the planetary driving gear, and an outer periphery of one of the half shaft connectors including a second contact surface, in which one of the first contact surface and the second contact surface is an annular surface, and the other one of the first contact surface and the second contact surface is a polygonal surface formed by a plurality of faces connected sequentially; and a differential lock device including a plurality of rolling members, a rolling holder, a switching driving member, a switching driven member, and a second elastic reset mechanism. The plurality of rolling members are arranged in the rolling holder and in one-to-one correspondence with the plurality of faces of the polygonal surface, and the plurality of rolling members are movable along the corresponding faces to define a disengaged position and an engaged position relative to the annular surface; the driven disc rotates relative to one of the half shaft connectors when the rolling members are in the disengaged position, and the driven disc and the one of the half shaft connectors rotate synchronously when the rolling members are in the engaged position; the switching driven member is arranged on the rolling holder, the switching driving member selectively drives the switching driven member to move the rolling holder, and the rolling members move from the disengaged position to the engaged position; the second elastic reset mechanism returns the rolling member from the engaged position to the disengaged position; and the switching driven member comprises a main body, and a plurality of cutting portions being formed on an outer periphery of the main body and stirring air when the switching driven member rotates.

An axle of a vehicle according to the present disclosure includes: a driven disc, the driven disc being hollow inside, an inner peripheral surface of the driven disc being a first contact surface, and a planetary driving gear being arranged in the driven disc; two half shaft connectors arranged inside the driven disc and spaced apart in an axial direction, each of the half shaft connectors including a planetary driven gear, two planetary driven gears meshing with the planetary driving gear on two sides of the planetary driving gear, and an outer periphery of one of the half shaft connectors including a second contact surface, in which one of the first contact surface and the second contact surface is an annular surface, and the other one of the first contact surface and the second contact surface is a polygonal surface formed by a plurality of faces connected sequentially; and a differential lock device including a plurality of rolling members, a rolling holder, a switching driving member, and a switching driven member. The plurality of rolling members are arranged in the rolling holder and in one-to-one correspondence with the plurality of faces of the polygonal surface, and the plurality of rolling members are movable along the corresponding faces to define a disengaged position and an engaged position relative to the annular surface; the driven disc rotates relative to one of the half shaft connectors when the rolling members are in the disengaged position, and the driven disc and the one of the half shaft connectors rotate synchronously when the rolling members are in the engaged position; the switching driven member is arranged on the rolling holder, the switching driving member selectively drives the switching driven member to move the rolling holder, and the rolling members move from the disengaged position to the engaged position; and the switching driven member comprises a main body, and a plurality of cutting portions being formed on an outer periphery of the main body and stirring air when the switching driven member rotates.

A vehicle according to the present disclosure includes an axle. The axle includes: a driven disc, the driven disc being hollow inside, an inner peripheral surface of the driven disc being a first contact surface, and a planetary driving gear being arranged in the driven disc; two half shaft connectors arranged inside the driven disc and spaced apart in an axial direction, each of the half shaft connectors including a planetary driven gear, two planetary driven gears meshing with the planetary driving gear on two sides of the planetary driving gear, and an outer periphery of one of the half shaft connectors including a second contact surface, in which one of the first contact surface and the second contact surface is an annular surface, and the other one of the first contact surface and the second contact surface is a polygonal surface formed by a plurality of faces connected sequentially; and a differential lock device including a plurality of rolling members, a rolling holder, a switching driving member, and a switching driven member. The plurality of rolling members are arranged in the rolling holder and in one-to-one correspondence with the plurality of faces of the polygonal surface, and the plurality of rolling members are movable along the corresponding faces to define a disengaged position and an engaged position relative to the annular surface; the driven disc rotates relative to one of the half shaft connectors when the rolling members are in the disengaged position, and the driven disc and the one of the half shaft connectors rotate synchronously when the rolling members are in the engaged position; the switching driven member is arranged on the rolling holder, the switching driving member selectively drives the switching driven member to move the rolling holder, and the rolling members move from the disengaged position to the engaged position; and the switching driven member comprises a main body, and a plurality of cutting portions being formed on an outer periphery of the main body and stirring air when the switching driven member rotates.

BRIEF DESCRIPTION OF DRAWINGS

The above and/or additional aspects and advantages of the present disclosure will become apparent and easy to understand from following descriptions of embodiments in combination with accompanying drawings, in which.

DETAILED DESCRIPTION OF EMBODIMENTS

Embodiments of the present disclosure will be described in detail below, and the embodiments described with reference to the drawings are illustrative.

A drive system 1000 of a vehicle according to embodiments of the present disclosure will be described below with reference to FIGS. 1 to 30. The drive system 1000 provides power to the vehicle and drives wheels to travel on the road. The vehicle may be an all-terrain vehicle.

Figure 1:
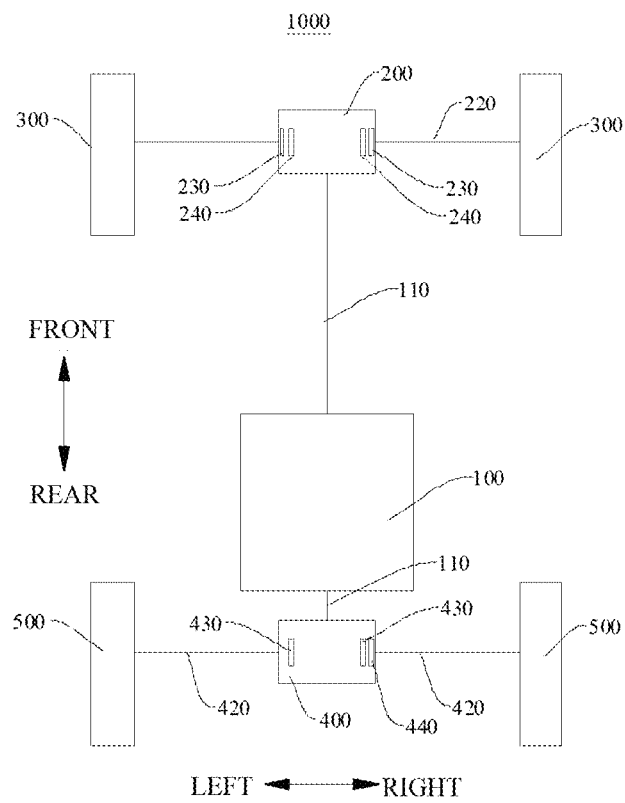
FIG. 1 is a schematic view of a drive system of a vehicle according to an embodiment of the present disclosure.
Figure 2:
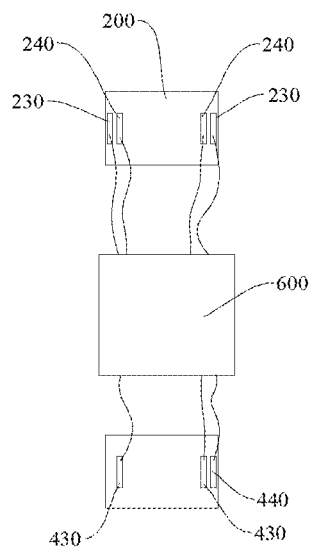
FIG. 2 is a schematic view of a controller for coupling an engagement device to a differential lock device according to an embodiment of the present disclosure.

As shown in FIG. 1 and FIG. 2, the drive system 1000 of the vehicle according to the embodiments of the present disclosure may include: a power device 100, a front axle 200, a front wheel 300, a rear axle 400, a rear wheel 500 and a controller 600. The vehicle may further include a frame. The power device 100, the front axle 200, the rear axle 400 and the controller 600 are all arranged on the frame. The front axle 200 and the rear axle 400 are spaced apart in a front-rear direction. The power device 100 may be arranged between the front axle 200 and the rear axle 400, or a reasonable position for arranging the power device may be selected according to an actual structure of the frame. The front wheel 300 is arranged at each of two ends of the front axle 200, and the rear wheel 500 is arranged at each of two ends of the rear axle 400. The controller 600 may control the power device 100 to engage the front axle 200 to transmit the power.

As shown in FIG. 1, the power device 100 may have two output shafts 110, and the two output shafts 110 transmit the power to the front axle 200 and the rear axle 400, respectively. There may be various options for the power device 100. For example, the power device 100 may be a fuel engine. As another example, the power device 100 may be an electric motor, and the electric motor may be an electric generator. As another example, the power device 100 may be a combination of the fuel engine and the electric motor, and the electric motor may be fixed on a left side or a right side of the fuel engine. The fuel engine may be fixed on a bottom of the frame, and the electric motor may be fixed on the right side of the fuel engine.

Figure 3:
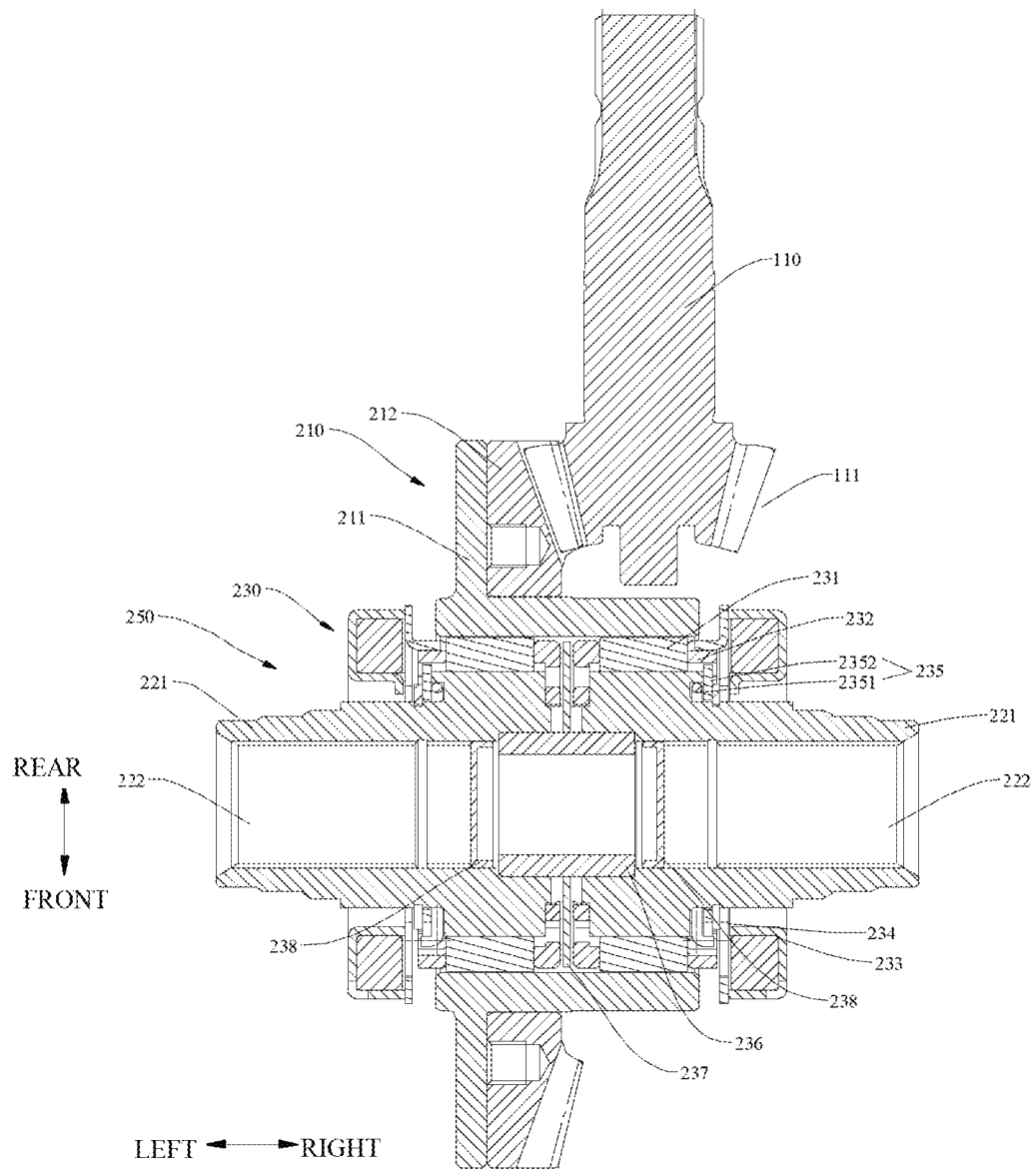
FIG. 3 is a sectional view of a front differential according to an embodiment of the present disclosure.

As shown in FIG. 1 and FIG. 3, the front axle 200 includes: a front driven disc 210, a front half shaft 220, an engagement device 230, and a front speed sensor 240. Two front half shafts 220 are provided, and the two front half shafts 220 are arranged opposite to each other in a left-right direction. Each front half shaft 220 includes a front half shaft connector 221 and a front shaft body, and the front half shaft connector 221 rotates synchronously with the front shaft body. The power is transmitted between the front driven disc 210 and the output shaft 110. A front driving gear 111 is arranged an end of the output shaft 110. The front driven disc 210 includes a front disc body 211 and a front driven gear 212. The front driving gear 111 meshes with the front driven gear 212, so that the power device 100 may transmit the power to the front axle 200 through the output shaft 110. The front driving gear 111 and the front driven gear 212 may be bevel gears.

Two sets of engagement devices 230 are provided and each arranged between the front driven disc 210 and the front half shaft connector 221. Two front wheels 300 are coupled to axial outer ends of the two front half shafts 220, i.e., axial outer ends of two front shaft bodies. It can be understood that when the engagement device 230 engages the front driven disc 210 and the front half shaft connector 221, the power output by the power device 100 may be transmitted to the front wheel 300 through the engagement device 230 and the front half shaft 220, to drive the vehicle to travel on the road. When the engagement device 230 disengages the front driven disc 210 from the front half shaft connector 221, the power output by the power device 100 cannot be transmitted to the front half shaft connector 221 through the front driven disc 210, and the two front wheels 300 act as driven wheels. The front axle 200 includes a front differential 250, and the front differential 250 includes: the above-mentioned front driving gear 111, the above-mentioned front driven disc 210, the above-mentioned two front half shaft connectors 221 and the above-mentioned two sets of engagement devices 230. A specific structure of the front differential 250 will be described in detail below.

As shown in FIG. 1 and FIG. 2, the front speed sensor 240 is configured to detect a speed of the corresponding front half shaft 220. Two front speed sensors 240 may be provided and configured to detect speeds of the two front half shafts 220, respectively, to obtain speeds of the two front wheels 300. Specifically, an ABS signal gear 270 may be arranged on the front half shaft connector 221, and the front speed sensor 240 is configured to detect the number of rotating teeth of the ABS signal gear 270, so that the information may be transmitted to the controller 600 and speed information on the corresponding front wheel 300 may be obtained.

Figure 18:
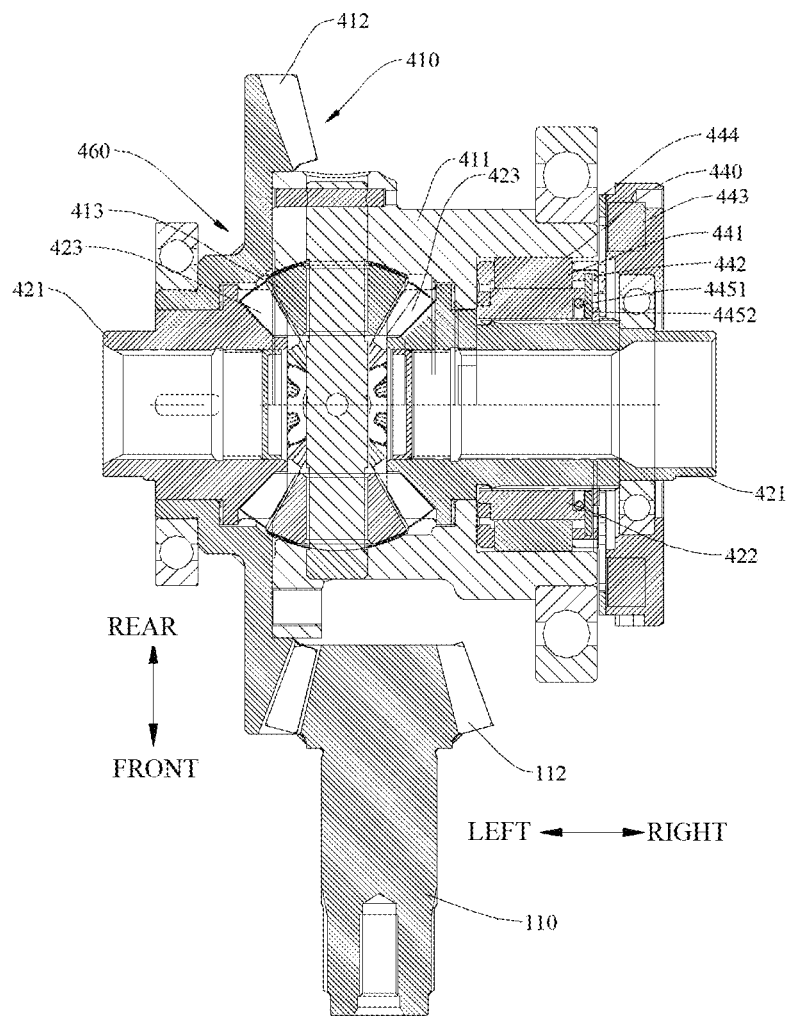
FIG. 18 is a sectional view of a rear differential.

As shown in FIG. 1 and FIG. 18, the rear axle 400 includes: a rear driven disc 410, a rear half shaft 420, and a rear speed sensor 430. Two rear half shafts 420 are provided and arranged opposite to each other in the left-right direction. The power is transmitted between the rear driven disc 410 and the output shaft 110. A rear driving gear 112 is arranged at an end of the output shaft 110. The rear driven disc 410 includes a rear disc body 411 and a rear driven gear 412. The rear driving gear 112 meshes with the rear driven gear 412, so that the power device 100 may transmit the power to the rear axle 400 through the output shaft 110. The rear driving gear 112 and the rear driven gear 412 may be bevel gears. The rear axle 400 includes a rear differential 460, and the rear differential 460 includes the above-mentioned rear driven disc 410 and two rear half shaft connectors 421. A specific structure of the rear differential 460 will be described in detail below.

As shown in FIG. 18, the power is transmitted between the two rear half shafts 420 and the rear driven disc 410. A planetary driving gear 413 is arranged in the rear driven disc 410. Each of the two rear half shafts 420 includes a rear half shaft connector 421, and a planetary driven gear 423 is arranged on the rear half shaft connector 421. The planetary driving gear 413 meshes with the planetary driven gear 423, to transmit the power. It can be understood that the rear wheel 500 acts as a drive wheel when the power device 100 outputs the power.

As shown in FIG. 1 and FIG. 2, the rear speed sensor 430 is configured to detect a speed of the corresponding rear half shaft 420. Two rear speed sensors 430 may be provided and configured to detect speeds of the two rear half shafts 420 respectively, to obtain speeds of the two rear wheels 500. Specifically, an ABS signal gear may be arranged on the rear half shaft connector 421, and the rear speed sensor 430 is configured to detect the number of rotating teeth of the ABS signal gear, so that the information may be transmitted to the controller 600 and speed information on the corresponding rear wheel 500 may be obtained.

As shown in FIG. 2, the controller 600 is electrically coupled to the engagement device 230, the front speed sensor 240 and the rear speed sensor 430, to control the engagement device 230 to operate when a predetermined condition is met, so that the front driven disc 210 is engaged with the front half shaft 220. It can be understood that the controller 600 may receive the speed information from the two front speed sensors 240 and the two rear speed sensors 430, and then obtain states of the front wheels 300 and the rear wheels 500, to judge whether a driving state of the whole vehicle needs to be switched between 2WD (Two Wheel Drive) and 4WD (Four Wheel Drive) according to the information. If it is determined that the driving state of the whole vehicle meets the predetermined condition, the controller 600 may accurately switch the driving state between 2WD and 4WD according to its own judgment without any intervention of a driver, so that the engagement device 230 engages the front half shaft connector 221 of the front half shaft 220 and the front driven disc 210, to switch the vehicle from a 2WD mode to a 4WD mode. Thus, the power and the driving stability of the vehicle can be improved, the vehicle can drive more stably under current road conditions, damage to internal components of the vehicle can be avoided, and the service life of the vehicle can be prolonged.

It should be noted that the above-mentioned predetermined condition is not limited to one predetermined condition.

Optionally, a speed difference between the two rear wheels 500 is V1, a turning radius speed difference between the two rear wheels 500 is V2, and a safety factor is a. The turning radius speed difference refers to a speed difference between a left wheel and a right wheel when the two wheels have a minimum turning radius. When $V1>V2*a$, the controller 600 controls the engagement device 230 to engage the front driven disc 210 and the front half shaft 220; and when $V1<V2*a$, the controller 600 controls the engagement device 230 to disengage the front driven disc 210 from the front half shaft 220. That is, when the driver drives the vehicle, the controller 600 controls the vehicle to switch from the 2WD mode to the 4WD mode when a wheel running state of the vehicle meets a condition of $V1>V2*a$, and the controller 600 controls the vehicle to switch from the 4WD mode to the 2WD mode when the wheel running state of the vehicle meets a condition of $V1<V2*a$. By setting such predetermined conditions, the vehicle can be adapted to various harsh road conditions, and avoid slipping when steering, so that the driving stability of the vehicle can be improved, damage to a transmission system and wheels can be avoided, and the service life of the vehicle can be prolonged.

Optionally, a speed difference between the front wheel 300 and the rear wheel 500 is V3, an average speed of the front wheel 300 and the rear wheel 500 is V4, and a safety factor is a. When $V3>V4*a$, the controller 600 controls the engagement device 230 to engage the front driven disc 210 and the front half shaft 220; and when $V3<V4*a$, the controller 600 controls the engagement device 230 to disengage the front driven disc 210 from the front half shaft 220. That is, when the driver drives the vehicle, the controller 600 controls the vehicle to switch from the 2WD mode to the 4WD mode when the wheel running state of the vehicle meets a condition of V3>V4*a, and the controller 600 controls the vehicle to switch from the 4WD mode to the 2WD mode when the wheel running state of the vehicle meets a condition of V3<V4*a. By setting such predetermined conditions, the vehicle can be adapted to various harsh road conditions, and avoid slipping when the steering, so that the driving stability of the vehicle can be improved, the damage to the transmission system and wheels can be avoided, and the service life of the vehicle can be prolonged.

The front differential 250 in the front axle 200 will be described in detail below in combination with the accompanying drawings.

According to an optional embodiment of the present disclosure, as shown in FIG. 3, the front differential 250 may include: the above-mentioned front driving gear 111, the above-mentioned front driven disc 210, the above-mentioned two front half shaft connectors 221 and the above-mentioned two sets of engagement devices 230.

As shown in FIG. 3, the front disc body 211 of the front driven disc 210 is hollow inside, an inner peripheral surface of the front disc body 211 is a first contact surface, and an outer peripheral surface of the half shaft connector is a second contact surface. One of the first contact surface and the second contact surface is an annular surface, and the other one of the first contact surface and the second contact surface is a polygonal surface formed by a plurality of faces connected sequentially. For example, as shown in FIG. 3, the first contact surface is an annular surface and the second contact surface is a polygonal surface. As another example, the first contact surface is a polygonal surface and the second contact surface is an annular surface.

As shown in FIG. 3, the two sets of engagement devices 230 are in one-to-one correspondence with the two front half shaft connectors 221, and the two sets of engagement devices 230 are both arranged in the front disc body 211 of the front driven disc 210. The two sets of engagement devices 230 are spaced apart in an axial direction, and the axial direction is the left-right direction shown in FIG. 3. The two sets of engagement devices 230 are configured to be selectively engaged with the corresponding front half shaft connectors 221, and the two sets of engagement devices 230 may be engaged synchronously under an action of the controller 600.

As shown in FIG. 3, each set of engagement devices 230 includes: a first rolling member 231, a first rolling holder 232, a first switching driving member 233, a first switching driven member 234, and a first elastic reset mechanism 235. A plurality of first rolling members 231 are provided and arranged in the first rolling holder 232, and the first rolling members 231 may be rollers. The first rolling holder 232 may include a plurality of accommodation grooves spaced apart in a peripheral direction, and the rollers are accommodated in the accommodation grooves. The rollers may roll in the accommodation grooves, and protrude out of the accommodation grooves from a radial inner side and a radial outer side.

Figure 5:
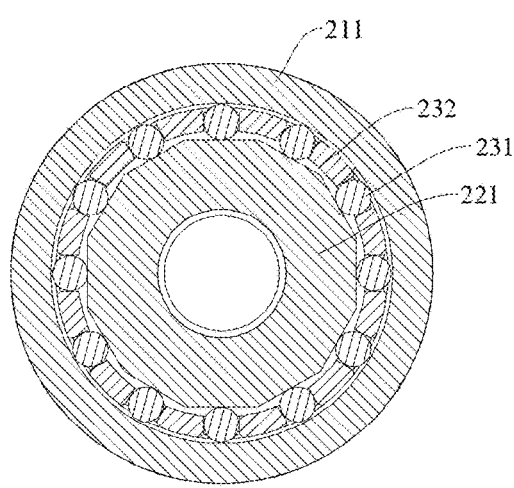
FIG. 5 is a sectional view illustrating that a rolling member of a front axle is in a disengaged position.
Figure 6:
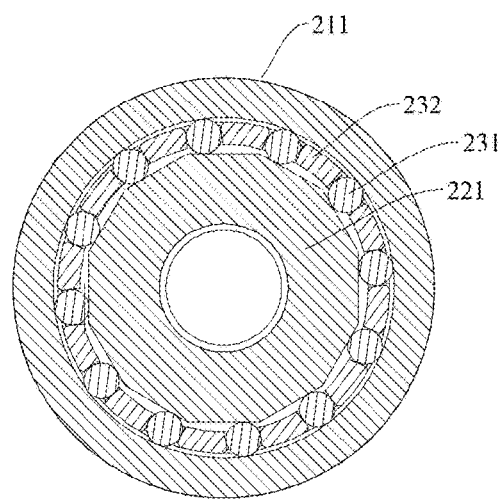
FIG. 6 is a sectional view illustrating that a rolling member of a front axle is in an engaged position.

As shown in FIG. 5 and FIG. 6, the plurality of first rolling members 231 are arranged in one-to-one correspondence with the plurality of faces of the polygonal surface, and the plurality of first rolling members 231 may move along corresponding faces, to define a disengaged position and an engaged position relative to the annular surface. That is, the number of the first rolling members 231 may be identical to the number of faces included by the polygonal surface, and each first rolling member 231 corresponds to one surface of the polygonal surface.

As shown in FIG. 5, the first rolling member 231 is located in the disengaged position, and at this time, the first rolling member 231 is located in a center position of the corresponding surface of the polygonal surface. Since a distance from the center position of each face of the polygonal surface to the annular surface is maximum, a gap is formed between the first rolling member 231 and the front disc body 211, so that the front driven disc 210 and the front half shaft connector 221 rotate relative to each other without mutual interference. As shown in FIG. 6, the first rolling member 231 is in the engaged position, and at this time, the first rolling member 231 is located at a side edge of the corresponding surface of the polygonal surface. Since a distance from the side edge of each face of the polygonal surface to the annular surface is minimum, the first rolling member 231 is in contact with and abuts against the front disc body 211, so that the front driven disc 210 may rotate synchronously with the front half shaft connector 221. It can be understood that when the first rolling member 231 is in the disengaged position, there is the gap between the first rolling member 231 and the front disc body 211, with no contact therebetween. At this time, the power of the front driving gear 111 cannot be transmitted to the front half shaft connector 221 through the front driven disc 210, so that the front disc body 211 and the front half shaft connector 221 may rotate relative to each other without mutual interference. In such a case, the vehicle is in the 2WD mode. When the first rolling member 231 is in the engaged position, the first rolling member 231 is in contact with and abuts against the front disc body 211. In other words, the first rolling member 231 in the engaged position makes the front disc body 211 and the front half shaft connector 221 get stuck. At this time, the power of the front driving gear 111 may be transmitted to the front half shaft connector 221 through the front driven disc 210, so that they may rotate synchronously. In such a case, the vehicle is in the 4WD mode. It should be noted here that since each face of the polygonal surface has two side edge positions, the first rolling member 231 has two disengaged positions correspondingly.

As shown in FIG. 3, the first switching driven member 234 is arranged on the first rolling holder 232, and the first switching driven member 234 may drive the first rolling holder 232 to rotate synchronously. The first switching driving member 233 selectively drives the first switching driven member 234 to drive the first rolling holder 232 to move, so that the first rolling member 231 is driven to move along the corresponding surface of the polygonal surface from the disengaged position to the engaged position. The first switching driving member 233 has a function of controlling movement of the first switching driven member 234, and may control the first switching driven member 234 to move according to its own state, to control the first rolling member 231 to move from the disengaged position to the engaged position, i.e., to realize the switch from the 2WD mode to the 4WD mode. The controller 600 is electrically coupled to the first switching driving members 233 of the two sets of engagement devices 230, so that the controller 600 may correspondingly control whether the first switching driving member 233 drives the first switching driven member 234 to move.

As shown in FIG. 3, the first elastic reset mechanism 235 is configured to return the first rolling member 231 from the engaged position to the disengaged position through the first rolling holder 232. That is, during the switch from the 4WD mode to the 2WD mode, the first elastic reset mechanism 235 may drive the first rolling holder 232 to move by its own elastic force, to move the first rolling member 231 from the engaged position to the disengaged position, realizing the switch from the 4WD mode to the 2WD mode. During this process, the first switching driving member 233 no longer controls the first switching driven member 234.

Therefore, by providing the first rolling member 231 and the first rolling holder 232 between the front half shaft connector 221 and the front disc body 211, the switch between an engaged state and a disengaged state of the front half shaft connector 221 and the front disc body 211 can be timely and reliable. Moreover, by providing the first switching driving member 233 and the first elastic reset mechanism 235, the switch from the 2WD mode to the 4WD mode and the switch from the 4WD mode to the 2WD mode can be controlled. The front differential 250 thus arranged may adopt different controlled switching modes, so that the switch of the engagement devices 230 is flexible, the switching stability is good and no jamming occurs.

Specifically, as shown in FIG. 3, the first switching driving member 233 is an electromagnetic member electrically coupled to the controller 600. The electromagnetic member may be an electromagnet fixed in a housing 260 of the front axle 200, and the electromagnet and the controller 600 may be coupled via a wire harness. The first switching driven member 234 is a metal member. The first switching driving member 233 attracts the first switching driven member 234 when the first switching driving member is in an energized state, so that the first switching driven member 234 may drive the first rolling holder 232 to move, to promote the first rolling member 231 to move from the disengaged position to the engaged position. The first rolling member 231 is in the disengaged position when the first switching driving member 233 is in a de-energized state. That is, the first elastic reset mechanism 235 may use its elastic force to promote the first rolling holder 232 to move when the first switching driving member 233 is in the de-energized state, so that the first rolling member 231 moves from the engaged position to the disengaged position. The first switching driving member 233 thus arranged controls the position of the first rolling member 231 through an electromagnetic force, so that the engagement device 230 may have a simple structure and realize reliable control, and the state can be switched timely. In addition, the first elastic reset mechanism 235 further has a function of keeping the first rolling member 231 in the disengaged position, so that the first rolling holder 232 may rotate synchronously with the front half shaft connector 221.

Figure 9:
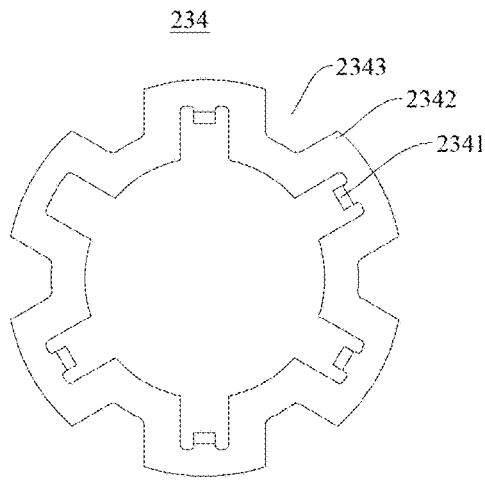
FIG. 9 is a front view of a switching driven member of an engagement device.
Figure 10:
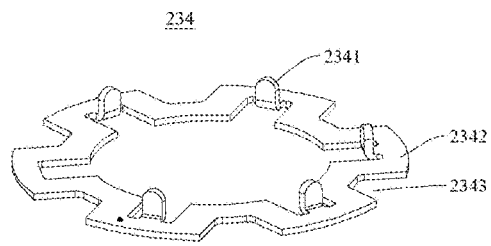
FIG. 10 is a perspective view of a switching driven member of an engagement device.
Figure 11:
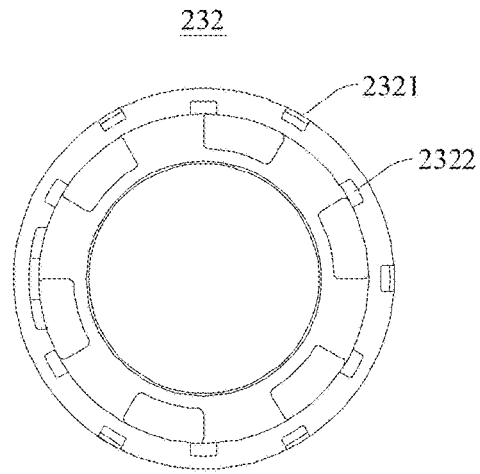
FIG. 11 is a front view of a rolling holder of an engagement device.
Figure 12:
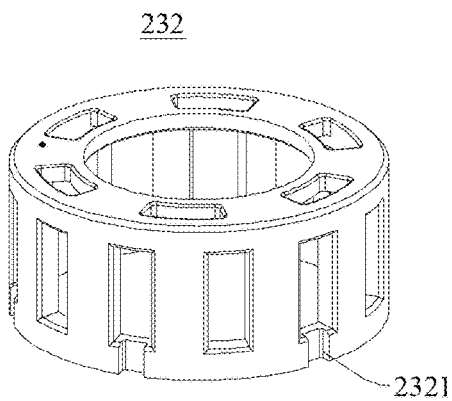
FIG. 12 is a perspective view of a rolling holder of an engagement device.

As shown in FIG. 9 and FIG. 10, the first switching driven member 234 includes a first limit portion, the first rolling holder 232 includes a second limit portion on its outer side, and the first limit portion and the second limit portion perform peripheral limitation, to drive the first rolling holder 232 to move in the peripheral direction. That is, the first switching driven member 234 and the first rolling holder 232 are limited and fitted by the two limit portions, so that the first switching driven member 234 and the first rolling holder 232 may rotate synchronously in the peripheral direction. As a result, after the first switching driving member 233 is energized, the first switching driven member 234 may drive the first rolling holder 232 to move, so that the first rolling member 231 may move from the disengaged position to the engaged position. In addition, by providing the two limit portions, the displacement of the first switching driven member 234 can be reduced, and the fitting between the first switching driven member 234 and the first rolling holder 232 can be simple and reliable.

As shown in FIG. 3, the first switching driving member 233 is located at an axial outer side of the first switching driven member 234, and the first switching driving member 233 provides the first switching driven member 234 with a magnetic attraction force opposite to a moving direction of the front half shaft connector 221, so that the first rolling holder 232 drives the first rolling member 231 to turn to the engaged position. An outer side surface of the first switching driven member 234 may abut on the first switching driving member 233. When the first rolling member 231 is in the disengaged position, the first switching driven member 234 rotates together with the first rolling member 231, and the first switching driven member 234 frictionally moves on a surface of the first switching driving member 233. After the first switching driving member 233 is energized, the first switching driving member 233 may generate the magnetic attraction force opposite to the moving direction, so that the first rolling holder 232 and the front half shaft connector 221 may move relative to each other, further allowing the first rolling member 231 to move from the disengaged position to the engaged position. The first switching driving member 233 thus arranged may quickly generate resistance that causes the first switching driven member 234 to move in a reverse direction, and an axial movement of the first switching driven member 234 is not required, so that an axial space occupied by the engagement device 230 is small and the structure is more compact.

As shown in FIG. 10, FIG. 11, FIG. 12 and FIG. 16, the first limit portion includes a plurality of first protrusions 2341 peripherally spaced on the first switching driven member 234 and extending towards the first rolling holder 232; and the second limit portion includes a plurality of first grooves 2321 peripherally spaced and arranged on a side, facing the first switching driven member 234, of an outer ring of the first rolling holder 232. The plurality of first protrusions 2341 are fitted with the plurality of first grooves 2321 in one-to-one correspondence. By providing the plurality of first protrusions 2341 and the plurality of first grooves 2321, the peripheral limitation of the first switching driven member 234 and the first rolling holder 232 can be stable, and the synchronous rotation can be more stable. An end of the first protrusion 2341 may be semicircular, and the first groove 2321 may be a rectangular groove. The first protrusion 2341 thus arranged may be easily inserted into the rectangular groove, improving the assembly efficiency of the first switching driven member 234 and the first rolling holder 232.

As shown in FIG. 3, FIG. 13, FIG. 14 and FIG. 17, the first elastic reset mechanism 235 includes: a first elastic member 2351 and a first limit member 2352. The first limit member 2352 rotates synchronously with the first rolling holder 232. The first elastic member 2351 is fitted over the front half shaft connector 221, and two ends of the first elastic member 2351 are fitted on the first limit member 2352 and the front half shaft connector 221 correspondingly. The first limit member 2352 may function to limit and fit with the first elastic member 2351. It can be understood that the first elastic member 2351 is an elastic ring with a notch, each of two ends of the elastic ring has a first stop portion 2354, and the first stop portions 2354 are fitted on the first limit member 2352 and the front half shaft connector 221 correspondingly. Therefore, after the first switching driving member 233 is de-energized, the first elastic member 2351 may release a stored elastic force and drive the first rolling holder 232 to move relative to the front half shaft connector 221, so that the first rolling member 231 moves from the engaged position to the disengaged position, realizing the switch from the 4WD mode to the 2WD mode.

Figure 13:
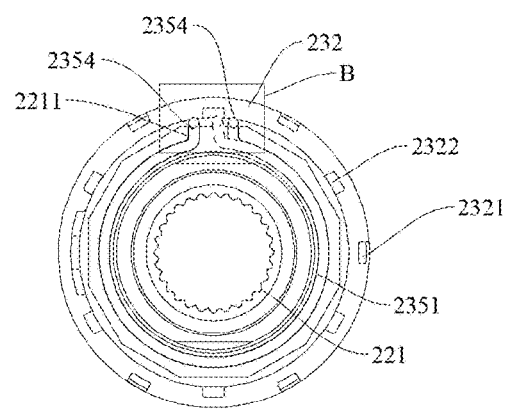
FIG. 13 is a schematic view illustrating that a front half shaft connector is fitted with a rolling holder.
Figure 14:
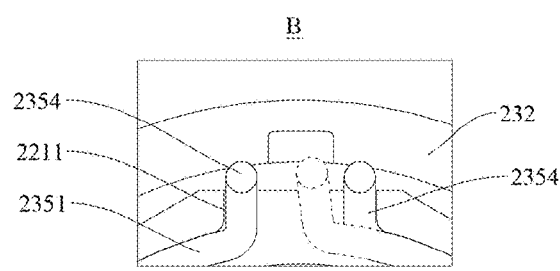
FIG. 14 is an enlarged view of region B in FIG. 13.
Figure 15:
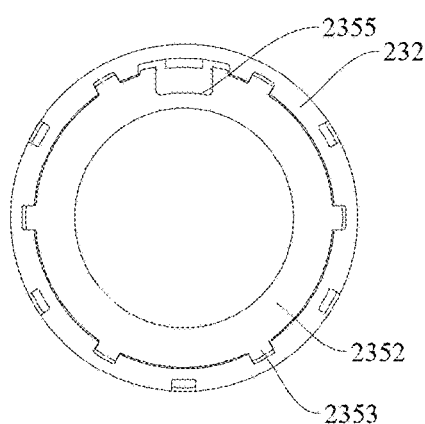
FIG. 15 is a schematic view illustrating that a rolling holder is fitted with a first limit member.
Figure 16:
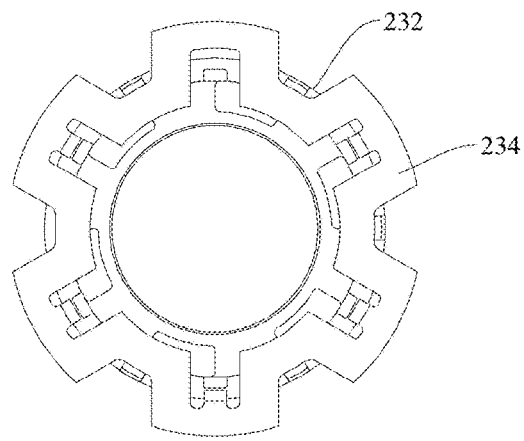
FIG. 16 is a schematic view illustrating that a rolling holder is fitted with a switching driven member.
Figure 17:
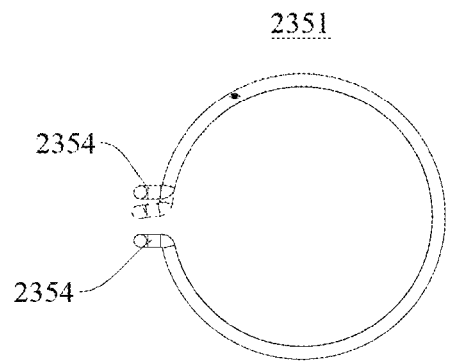
FIG. 17 is a schematic view of a first elastic member.

As shown in FIG. 13 and FIG. 14, the first limit member 2352 includes a plurality of second protrusions 2353 peripherally spaced and extending radially outward; and the first rolling holder 232 includes a plurality of second grooves 2322 peripherally spaced on a side, facing the first limit member 2352, of an inner ring of the first rolling holder 232. The plurality of second protrusions 2353 are fitted with the plurality of second grooves 2322 in one-to-one correspondence. The first limit member 2352 is shaped as a sheet. The first limit member 2352 includes a first avoidance groove 2355 on its outer periphery, and the front half shaft connector 221 includes a second avoidance groove 2211 at a corresponding position. The first stop portions 2354 of the first elastic member 2351 abut on corresponding side walls of the first avoidance groove 2355 and the second avoidance groove 2211. By providing the plurality of second protrusions 2353 and the plurality of second grooves 2322, the first limit member 2352 and the first rolling holder 232 can realize stable peripheral limitation and be effectively spaced apart from the first switching driven member 234. Thus, the engagement device 230 can have the compact structure and be reasonably arranged.

Specifically, when the first switching driven member 234 drives the first rolling holder 232 to move, the first limit member 2352 is driven to move, and the first limit member 2352 in turn drives one end of the first elastic member 2351 to move towards the other end of the first elastic member 2351, as shown in FIG. 13, until the first rolling member 231 moves to the engaged position, so that the first elastic member 2351 deforms to generate an elastic restoring force. After the first switching driving member 233 is de-energized, the first elastic member 2351 may release the stored elastic force, to move the first rolling member 231 from the engaged position to the disengaged position, so that the first rolling member 231 completes the switch from the disengaged position to the engaged position and again to the disengaged position, i.e., the conversion of the vehicle from the 2WD mode to the 4WD mode, and again to the 2WD mode.

Figure 27:
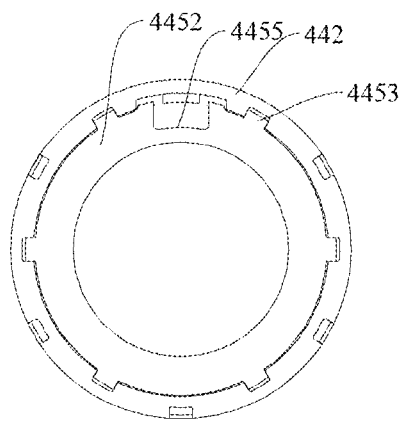
FIG. 27 is a schematic view illustrating that a rolling holder and a second limit member are fitted with each other in a differential lock device.

As shown in FIG. 27, the front axle 200 may further include the housing 260, and the first switching driving member 233 is fixed in the housing 260. That is, the electromagnet is fixed on an inner peripheral wall of the housing 260, so that the electromagnet can be fixed reliably, and it is convenient for the wire harness of the electromagnet to pass through the housing 260 and be electrically coupled to the controller 600. The electromagnet is annular, and the front half shaft connector 221 may correspondingly pass through the annular electromagnet, to prevent the electromagnet from interfering with the rotation of the front half shaft connector 221.

Figure 7:
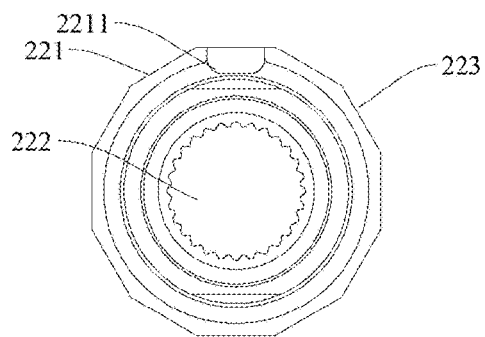
FIG. 7 is a front view of a front half shaft connector.
Figure 8:
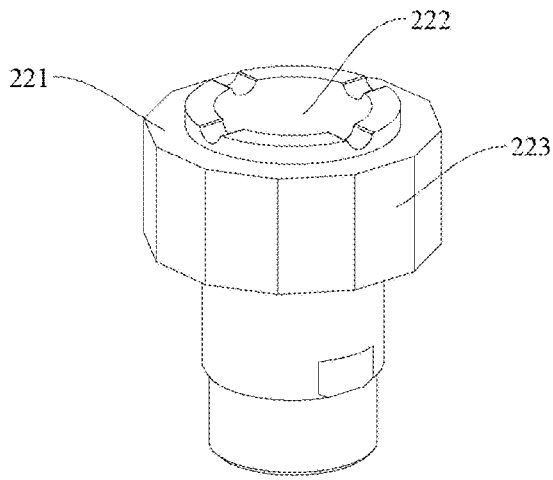
FIG. 8 is a perspective view of a front half shaft connector.

As shown in FIG. 7 and FIG. 8, each face of the polygonal surface is a plane 223, and each first rolling member 231 has one disengaged position and two engaged positions, the disengaged position being located between the two engaged positions. It can be understood that when the vehicle operates in a forward gear and in the 4WD mode, the first rolling member 231 is fitted in one engaged position; and when the vehicle operates in a reverse gear and in the 4WD mode, the first rolling member 231 is fitted in the other engaged position. The engagement device 230 thus arranged may effectively allow the vehicle to switch into the 4WD mode when the vehicle operates in the forward gear or the reverse gear, ensuring the formal stability of the vehicle.

The front half shaft connector 221 is coupled to the front shaft body, and the front shaft body is splined to the front half shaft connector 221. Specifically, the front half shaft connector 221 has a shaft hole 222, an inner peripheral wall of the shaft hole 222 includes an internal spline, an inner end of the front shaft body includes an external spline, and the internal spline is fitted with the external spline, to ensure that the front half shaft connector 221 rotates synchronously with the front shaft body. An outer end of the front shaft body is coupled to the front wheel 300.

Figure 4:
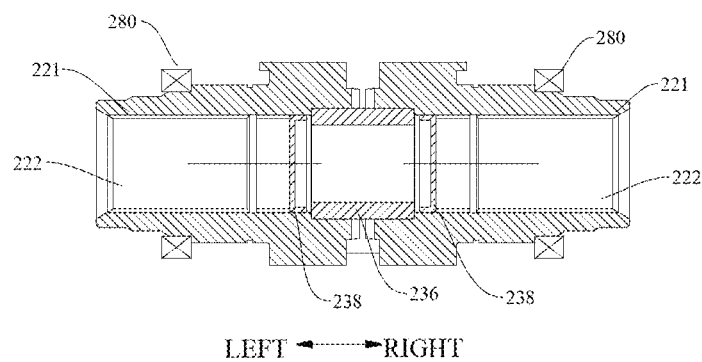
FIG. 4 is a sectional view of two front half shaft connectors in a front axle.

According to a specific embodiment of the present disclosure, as shown in FIG. 4, the front differential 250 may further include a collinear retainer, and the collinear retainer is arranged between the two front half shaft connectors 221 to keep axes of the two front half shaft connectors 221 collinear. By providing the collinear retainer, the position deviation of the axes of the two front half shaft connectors 221 may be avoided, to ensure that axes of the two front half shafts 220 and axes of the two front wheels 300 are collinear, so that the operation stability of the front axle 200 is ensured and the vehicle drives smoothly on the road.

As shown in FIG. 4, the collinear retainer may be a shaft sleeve 236 arranged in shaft holes 222 of the two front half shaft connectors 221, and at least one front half shaft connector 221 may rotate relative to the shaft sleeve 236. The shaft sleeve 236 has a simple structure and can effectively ensure that the axes of the two front half shaft connectors 221 are collinear, so that the position deviation of one of the two front half shaft connectors 221 may be avoided. Moreover, the two front half shaft connectors 221 are fitted over the shaft sleeve 236, so that the axial space of the front axle 200 can be saved.

One of the two front half shaft connectors 221 is in an interference fit with the shaft sleeve 236, and the other one of the two front half shaft connectors 221 is in a clearance fit with the shaft sleeve 236. That is, the shaft sleeve 236 rotates synchronously with one of the two front half shaft connectors 221 and rotates relative to the other front half shaft connector 221, so that the shaft sleeve 236 may keep the axes collinear while ensuring no interference between the two front half shaft connectors 221, to improve the structural stability of the front differential 250.

As shown in FIG. 4, a sealing member is arranged in the shaft hole 222 of each front half shaft connector 221, and the sealing member is located on an axial outer side of the shaft sleeve 236. The sealing member may seal the shaft hole 222 of the front half shaft connector 221, prevent lubricating oil from flowing out of the housing 260 of the front axle 200, and ensure the internal sealing performance of the front axle 200; moreover, the sealing member can prevent external impurities from entering the housing 260, prevent the front axle 200 from rusting when stored, and ensure the structural reliability of the front axle 200. Preferably, the sealing member is a bowl plug 238.

A step portion is arranged in the shaft hole 222, and the shaft sleeve 236 is located between step portions of the two front half shaft connectors 221. The step portion may function to stop the shaft sleeve 236, and avoid an axial movement of the shaft sleeve 236. Thus, axial positions of the shaft sleeve 236 and the two front half shaft connectors 221 are stable, and the structural stability of the front differential 250 is further improved. As shown in FIG. 4, a bearing 280 for supporting is fitted over each front half shaft connector 221, and the bearing 280 may be a deep groove ball bearing.

Optionally, as shown in FIG. 3, the front differential 250 may further include a partition plate 237 fitted over the shaft sleeve 236, and the partition plate 237 is located between the two front half shaft connectors 221. By providing the partition plate 237, the two engagement devices 230 can be effectively separated, and axial displacement and mutual interference of the two engagement devices 230 can be avoided, further ensuring the working reliability of the two engagement devices 230.

Figure 29:
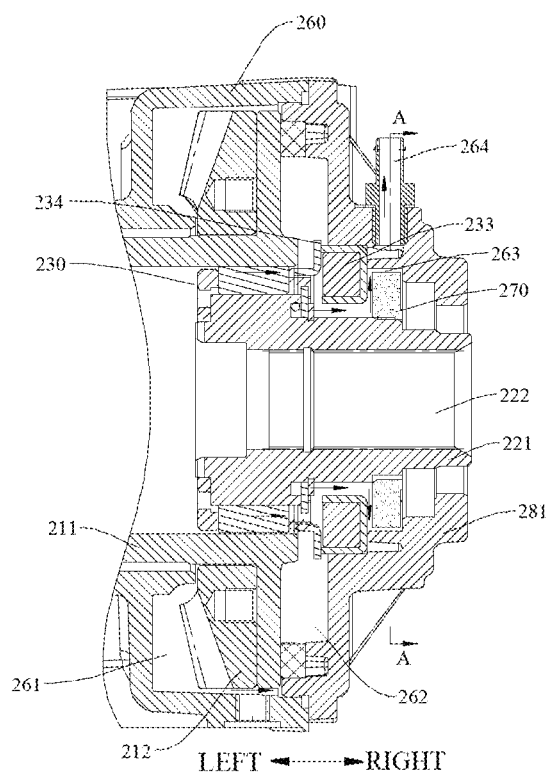
FIG. 29 is a sectional view of an engagement device in a front axle.

According to an optional embodiment of the present disclosure, as shown in FIG. 29, the housing 260 of the front axle 200 may include an opening 264. In the housing 260, a main oil chamber 261 and a primary separation chamber 262 are defined on two axial sides of the front disc body 211. The main oil chamber 261 is in communication with the primary separation chamber 262, and the primary separation chamber 262 is in communication with the opening 264. Therefore, air in the front axle 200 may flow through the primary separation chamber 262 and then to the outside via the opening 264. The housing 260 includes an end cover 281, the primary separation chamber 262 is located inside the end cover 281, and the opening 264 is formed in the end cover 281.

The primary separation chamber 262 includes a first oil-gas separation device arranged on the front half shaft connector 221. The first oil-gas separation device may perform oil-gas separation in the primary separation chamber 262, so that lubricating oil in the primary separation chamber 262 is precipitated on an inner peripheral wall of the housing 260 and then return to the main oil chamber 261, reducing the lubricating oil discharged from the opening 264, avoiding the loss of the lubricating oil and ensuring the lubrication reliability of the front axle 200.

Specifically, the first oil-gas separation device is the above-mentioned first switching driven member 234. Since the first switching driven member 234 is arranged on the first rolling holder 232, the first switching driven member may rotate synchronously with the first rolling holder 232 and the front half shaft connector 221. The first switching driven member 234 in a rotating state may continuously stir the air in the primary separation chamber 262, so that the lubricating oil in the air may be thrown onto the inner peripheral wall of the housing 260, reducing the discharge of the lubricating oil.

As shown in FIG. 9 and FIG. 10, the first switching driven member 234 includes a main body and the above-mentioned first limit portion, and the first limit portion is perpendicular to a surface of the main body. A plurality of cutting portions 2342 are formed on an outer periphery of the main body and mainly function to cut and stir the surrounding air when the first switching driven member 234 rotates, so that the lubricating oil in the air is precipitated on the inner peripheral wall of the housing 260.

Specifically, as shown in FIG. 9 and FIG. 10, a peripheral end surface of the cutting portion 2342 is an arc surface, and a spacing groove 2343 is arranged between two peripherally adjacent cutting portions 2342. The arc surface may allow the cutting portion 2342 to have a larger cutting edge, to better stir the air, and the spacing groove 2343 and the cutting portion 2342 are spaced apart, to enhance the stirring of air to a certain extent.

Further, as shown in FIG. 29, the ABS signal gear 270 is arranged inside the end cover 281 of the housing 260, and the ABS signal gear 270 and the end cover 281 define a secondary separation chamber 263 communicated between the primary separation chamber 262 and the opening 264. The ABS signal gear 270 is fitted over the front half shaft connector 221. The ABS signal gear 270 may correspond to the front speed sensor 240, and the front speed sensor 240 may detect the number of rotating teeth of the ABS signal gear 270 to calculate speed information. The air mixed with the lubricating oil flows to the secondary separation chamber 263 after passing through the primary separation chamber 262, and the rotating ABS signal gear 270 may stir the air in the secondary separation chamber 263 again, so that the lubricating oil in the air may be precipitated and return to the main oil chamber 261. The ABS signal gear 270 may be provided to cooperate with the front speed sensor 240 and further function to precipitate the lubricating oil in the air, to reduce the lubricating oil discharged from the opening 264 and ensure the lubrication reliability of the moving components in the front axle 200.

Figure 30:
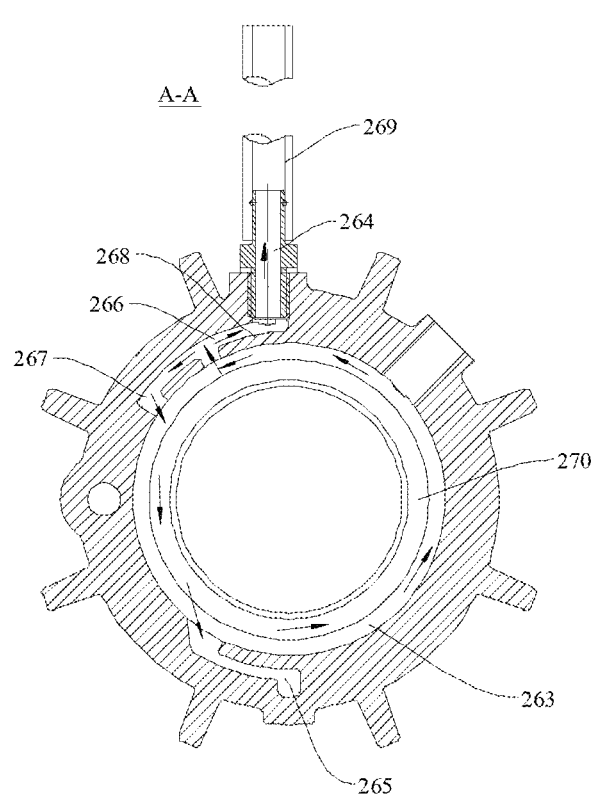
FIG. 30 is a sectional view in A-A direction in FIG. 29.

As shown in FIG. 30, an oil return groove 265 is formed at a bottom of the end cover 281 and communicated between the secondary separation chamber 263 and the primary separation chamber 262. It can be understood that in a rotation direction of the ABS signal gear 270, the lubricating oil is continuously precipitated and flows downward, then flows from the oil return groove 265 to the primary separation chamber 262, and then flows from the primary separation chamber 262 to the main oil chamber 261. The oil return groove 265 thus arranged can facilitate the return of the lubricating oil and reduce the loss of the lubricating oil more effectively, improving the lubrication reliability of the front axle 200.

Optionally, an air output channel 266 is formed on an inner side of the end cover 281 and communicated between the opening 264 and the secondary separation chamber 263. The air output channel 266 and the oil return groove 265 are spaced apart in a peripheral direction of the end cover 281. For example, the air output channel 266 may be arranged on a top of the end cover 281, allowing the air to rise until it is discharged from the opening 264, and reducing the upward discharge of the lubricating oil. In addition, part of the lubricating oil may further adhere to a channel wall of the air output channel 266, and then return to the oil return groove 265 of the secondary separation chamber 263.

Figure 31:
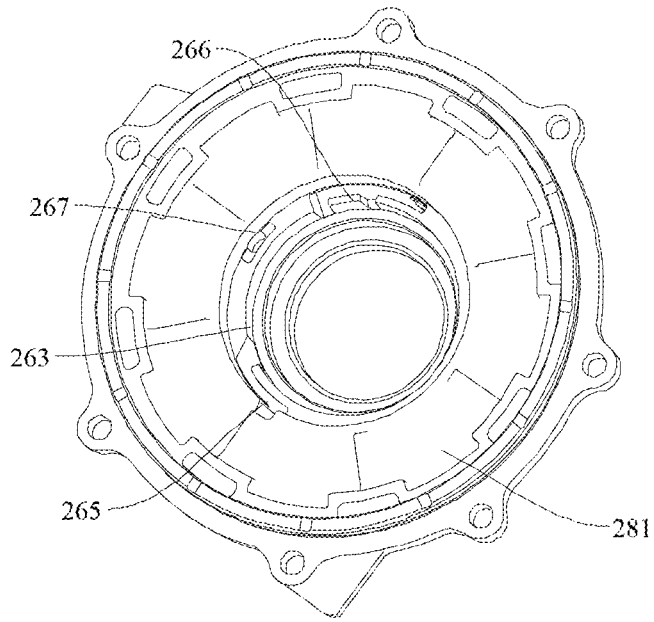
FIG. 31 is a perspective view of an end cover.

Further, as shown in FIG. 30 and FIG. 31, the air output channel 266 is further coupled to a return channel 267 in communication with the secondary separation chamber 263. In other words, during an air output process, part of the lubricating oil may return to the secondary separation chamber 263 through the return channel 267, then flow from the oil return groove 265 to the primary separation chamber 262, and finally return to the main oil chamber 261, further reducing the discharge of the lubricating oil, improving the lubrication reliability of the front differential 250, and prolonging the service life of the front axle 200. An internal space of the return channel 267 is a negative pressure area, which enables part of the lubricating oil to be absorbed back into the secondary separation chamber 263 by negative pressure, and an arc boss is arranged between an outlet of the return channel 267 and an inlet of the air output channel 266 and constitutes an inner side wall of the return channel 267.

In addition, as shown in FIG. 30, the opening 264 is located at the top of the end cover 281, and an oil retaining wall 268 is arranged inside the end cover 281 and located below the opening 264. That is, the opening 264 is not in direct communication with a chamber below it, and the oil retaining wall 268 can prevent the lubricating oil from directly entering the opening 264 to a certain extent, so that the discharge of the lubricating oil can be reduced at least to a certain extent.

As shown in FIG. 30, the opening 264 includes an interface coupled to a hose 269 extending vertically upward. The arrangement of the hose 269 can raise the highest point from which the air is discharged. By providing the hose 269, water can be prevented from entering an interior of the front differential 250 through the opening 264 in a wading environment, effectively protecting the front differential 250 and improving the reliability of the front differential 250.

The rear differential 460 of the rear axle 400 will be described in detail below in combination with the accompanying drawings.

Figure 19:
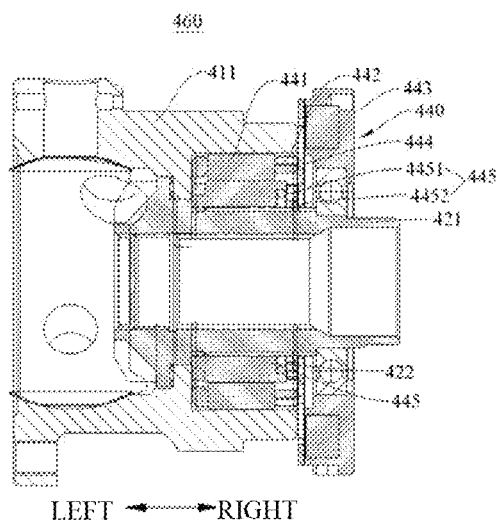
FIG. 19 is a sectional view of a rear differential with respect to a differential lock device.

As shown in FIG. 18 and FIG. 19, the rear differential 460 of the rear axle 400 of the vehicle according to the embodiments of the present disclosure may include: a rear driven disc 410, two rear half shaft connectors 421, and a differential lock device 440. The two rear half shaft connectors 421 and the differential lock device 440 are arranged on an inner side of the rear driven disc 410. One differential lock device 440 is provided, and the differential lock device 440 selectively locks one corresponding rear half shaft connector 421 and the rear driven disc 410 to achieve a locked state. Once the differential lock device 440 locks, the corresponding rear half shaft connector 421 and the rear driven disc 410 rotate synchronously. Due to characteristics of a planetary gear differential mechanism, the two rear half shaft connectors 421 also rotate synchronously, i.e., the two half shaft connectors 421 and the rear driven disc 410 rotate synchronously, to avoid slipping of the vehicle when steering or prevent the vehicle from getting off the slipping environment when the vehicle has slipped, and improve the driving stability of the vehicle. In a normal driving state, the differential lock device 440 is in an unlocking state, and the two rear half shaft connectors 421 are in a state of differential rotation.

Specifically, as shown in FIG. 18, the rear driven disc 410 includes a rear driven gear 412 and a rear disc body 411, and the rear driven gear 412 is fixed on an axial side of the rear disc body 411. The rear driven gear 412 meshes with the rear driving gear 112. The rear disc body 411 of the rear driven disc 410 is hollow inside, and an inner peripheral surface of the rear disc body 411 is a third contact surface. A planetary driving gear 413 is arranged in the rear driven disc 410. The two rear half shaft connectors 421 are arranged in the rear driven disc 410, and the two rear half shaft connectors 421 are spaced apart in the axial direction. The rear half shaft connector 421 includes a planetary driven gear 423. Two planetary driven gears 423 mesh with the planetary driving gear 413 on two sides of the planetary driving gear respectively. Thus, the power of the power device 100 may be transmitted to rear shaft bodies of the two rear half shafts 420 through the planetary driving gear 413 and the planetary driven gears 423, to drive the two rear wheels 500 to rotate on the road.

Figure 20:
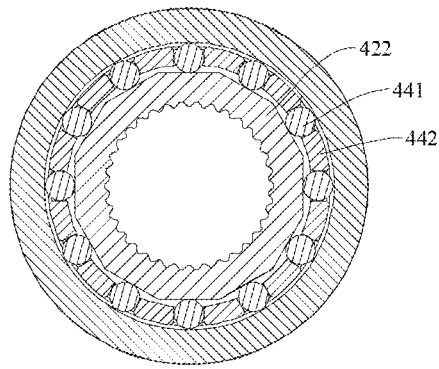
FIG. 20 is a sectional view illustrating that a rolling member of a rear axle is in a disengaged position.
Figure 21:
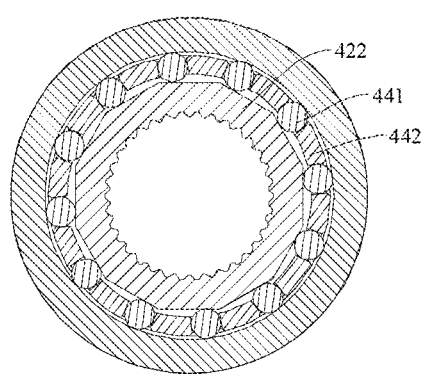
FIG. 21 is a sectional view illustrating that a rolling member of a rear axle is in an engaged position.
Figure 22:
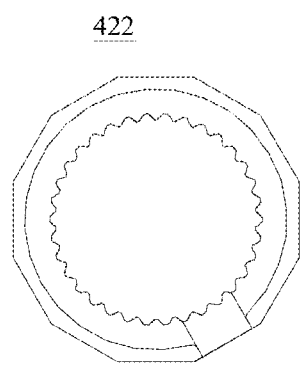
FIG. 22 is a schematic view of a fitting member.

As shown in FIGS. 20 to 22, one half shaft connector correspondingly includes a fourth contact surface, one of the third contact surface and the fourth contact surface is an annular surface, and the other one of the third contact surface and the fourth contact surface is a polygonal surface formed by a plurality of faces connected sequentially. The differential lock device 440 is arranged between the third contact surface and the fourth contact surface.

As shown in FIG. 18 and FIG. 19, the differential lock device 440 includes: a second rolling member 441, a second rolling holder 442, a second switching driving member 443, a second switching driven member 444, and a second elastic reset mechanism 445. A plurality of second rolling members 441 are provided, and the plurality of second rolling members 441 are arranged on the second rolling holder 442. The plurality of second rolling members 441 are arranged in one-to-one correspondence with the plurality of faces of the polygonal surface, and the plurality of second rolling members may move along the corresponding faces, to define a disengaged position and an engaged position relative to the annular surface.

As shown in FIG. 20, the second rolling member 441 is in the disengaged position, and at this time, the second rolling member 441 is located in a center position of the corresponding surface of the polygonal surface. Since a distance from the center position of each face of the polygonal surface to the annular surface is maximum, a gap is formed between the second rolling member 441 and the rear driven disc 410, so that the rear driven disc 410 and the rear half shaft connector 421 rotate relative to each other without mutual interference. As shown in FIG. 21, the second rolling member 441 is in the engaged position, and at this time, the second rolling member 441 is located at a side edge of the corresponding surface of the polygonal surface. Since a distance from the side edge of each face of the polygonal surface to the annular surface is minimum, the second rolling member 441 is in contact with and abuts against the rear driven disc 410, so that the rear driven disc 410 may rotate synchronously with the rear half shaft connector 421. It can be understood that when the second rolling member 441 is in the disengaged position, there is the gap between the second rolling member 441 and the rear disc body 411, with no contact therebetween, so that the rear disc body 411 and the rear half shaft connector 421 may rotate relative to each other without mutual interference. In such a case, the vehicle is in a normal driving state. When the second rolling member 441 is in the engaged position, the second rolling member 441 is in contact with and abuts against the rear disc body 411. In other words, the second rolling member 441 in the engaged position makes the rear disc body 411 and the rear half shaft connector 421 get stuck, so that they may rotate synchronously to realize a differential locking function.

As shown in FIG. 3, the second switching driven member 444 is arranged on the second rolling holder 442, so that the second switching driven member 444 may rotate synchronously with the second rolling holder 442. The second switching driving member 443 selectively drives the second switching driven member 444 to drive the second rolling holder 442 to move, so that the second rolling member 441 is driven to move along the corresponding surface of the polygonal surface from the disengaged position to the engaged position. The second switching driving member 443 has a function of controlling movement of the second switching driven member 444, and may control the second switching driven member 444 to move according to its own state, to control the second rolling member 441 to move from the disengaged position to the engaged position, i.e., to realize the differential locking function. The controller 600 is electrically coupled to the second switching driving member 443 of the differential lock device 440, so that the controller 600 may correspondingly control whether the second switching driving member 443 drives the second switching driven member 444 to move. That is, the controller 600 may selectively control whether the rear axle 400 adopts a differential locking operation according to an actual condition of the vehicle.

The second elastic reset mechanism 445 is configured to return the second rolling member 441 from the engaged position to the disengaged position through the second rolling holder 442. That is, when the differential locking function is released, the second elastic reset mechanism 445 may drive the second rolling holder 442 to move by its own elastic force, to move the second rolling member 441 from the engaged position to the disengaged position, realizing the differential locking function. During this process, the second switching driving member 443 no longer controls the second switching driven member 444.

Therefore, by providing the second rolling member 441 and the second rolling holder 442 between the rear half shaft connector 421 and the rear disc body 411, the switch between an engaged state and a disengaged state of the rear half shaft connector 421 and the rear disc body 411 can be fast and reliable. Moreover, the switch of the differential locking function may be controlled by providing the second switching driving member 443 and the second elastic reset mechanism 445. The rear differential 460 thus arranged may adopt different controlled switching modes, so that the switch of the differential lock device 440 is flexible, the switching stability is good and no jamming occurs.

Specifically, as shown in FIG. 18 and FIG. 19, the second switching driving member 443 is an electromagnetic member electrically coupled to the controller 600. The electromagnetic member may be an electromagnet fixed in the end cover 281 of the housing 260 of the rear axle 400, and the electromagnet and the controller 600 may be coupled via a wire harness. The second switching driven member 444 is a metal member. When the second switching driving member 443 is in an energized state, the second switching driving member 443 attracts the second switching driven member 444, so that the second switching driven member 444 drives the second rolling holder 442 to move, to promote the second rolling member 441 to move from the disengaged position to the engaged position. When the second switching driving member 443 is in a de-energized state, the second rolling member 441 is in the disengaged position. That is, when the second switching driving member 443 is in the de-energized state, the second elastic reset mechanism 445 may use its elastic force to promote the second rolling holder 442 to move, so that the second rolling member 441 moves from the engaged position to the disengaged position. The second switching driving member 443 thus arranged controls the position of the second rolling member 441 through an electromagnetic force, so that the differential lock device 440 may have a simple structure and realize reliable control, and the state can be switched timely.

Figure 23:
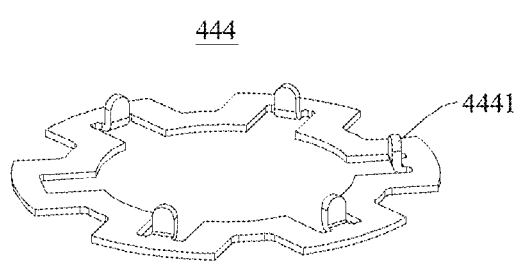
FIG. 23 is a schematic view of a switching driven member of a differential lock device.
Figure 25:
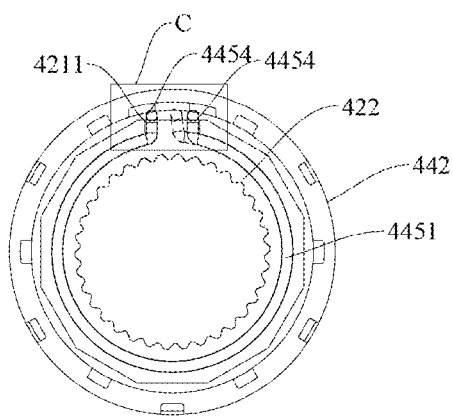
FIG. 25 is a schematic view illustrating that a fitting member and a rolling holder are fitted with each other.
Figure 28:
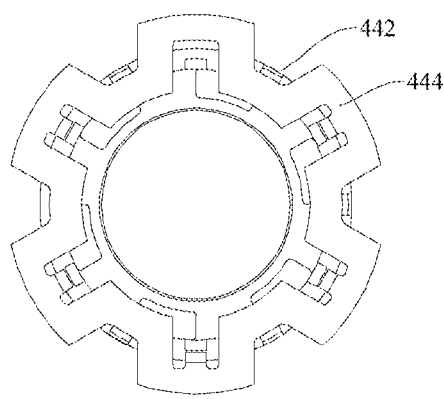
FIG. 28 is a schematic view illustrating that a switching driven member and a rolling holder are fitted with each other in a differential lock device.

As shown in FIG. 23, FIG. 25 and FIG. 28, the second switching driven member 444 includes a third limit portion, the second rolling holder 442 includes a fourth limit portion on its outer side, and the third limit portion and the fourth limit portion perform peripheral limitation, to drive the second rolling holder 442 to move in the peripheral direction. That is, the second switching driven member 444 and the second rolling holder 442 are limited and fitted by the two limit portions, so that the second switching driven member 444 may rotate synchronously with the second rolling holder 442 in the peripheral direction. As a result, after the second switching driving member 443 is energized, the second switching driven member 444 may drive the second rolling holder 442 to move, so that the second rolling member 441 may move from the disengaged position to the engaged position. In addition, by providing the two limit portions, the displacement of the second switching driven member 444 can be reduced, and the fitting between the second switching driven member 444 and the second rolling holder 442 can be simple and reliable.

As shown in FIG. 18 and FIG. 19, the second switching driving member 443 is located at an axial outer side of the second switching driven member 444, and the second switching driving member 443 provides the second switching driven member 444 with a magnetic attraction force opposite to a moving direction of the rear half shaft connector 421, so that the second rolling holder 442 drives the second rolling member 441 to turn to the engaged position. The second switching driven member 444 rotates together with the second rolling member 441. An outer side surface of the second switching driven member 444 may abut on the second switching driving member 443. When the second rolling member 441 is in the disengaged position, the second switching driven member 444 frictionally moves on a surface of the second switching driving member. After the second switching driving member 443 is energized, the second switching driving member 443 may generate the magnetic attraction force opposite to the moving direction, so that the second rolling holder 442 moves relative to the rear half shaft connector 421, further allowing the second rolling member 441 to move from the disengaged position to the engaged position. The second switching driving member 443 thus arranged may quickly generate resistance that causes the second switching driven member 444 to move in a reverse direction, and an axial movement of the second switching driven member 444 is not required, so that an axial space occupied by the differential lock device 440 is small and the structure is more compact.

As shown in FIG. 22 and FIG. 25, the third limit portion includes a plurality of third protrusions 4441 peripherally spaced on the second switching driven member 444 and extending towards the second rolling holder 442; and the fourth limit portion includes a plurality of third grooves 4421 peripherally spaced and arranged on a side, facing the second switching driven member 444, of an outer ring of the second rolling holder 442. The plurality of third protrusions 4441 are fitted with the plurality of third grooves 4421 in one-to-one correspondence. By providing the plurality of third protrusions 4441 and the plurality of third grooves 4421, the peripheral limitation of the second switching driven member 444 and the second rolling holder 442 can be stable, and the synchronous rotation can be more stable. An end of the third protrusion 4441 may be semicircular, and the third groove 4421 may be a rectangular groove. The third protrusion 4441 thus arranged may be easily inserted into the rectangular groove, improving the assembly efficiency of the second switching driven member 444 and the second rolling holder 442.

Figure 24:
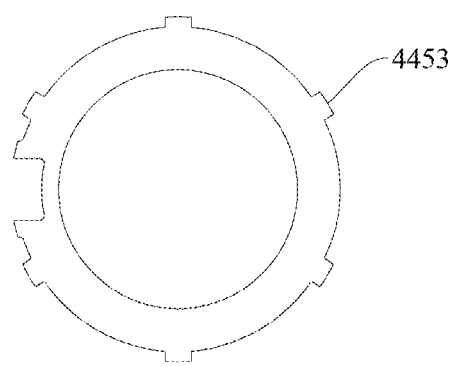
FIG. 24 is a schematic view of a second limit member of a differential lock device.
Figure 26:
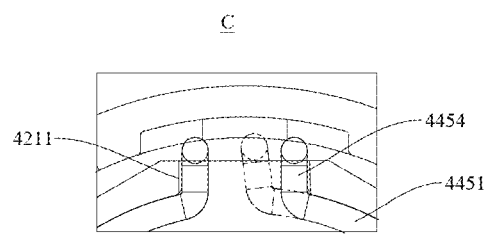
FIG. 26 is an enlarged view of region C in FIG. 25.

As shown in FIG. 18 and FIG. 24, the second elastic reset mechanism 445 includes: a second elastic member 4451 and a second limit member 4452. The second limit member 4452 rotates synchronously with the second rolling holder 442. The second elastic member 4451 is fitted over the rear half shaft connector 421, and two ends of the second elastic member 4451 are fitted on the second limit member 4452 and the rear half shaft connector 421 correspondingly. The second limit member 4452 may function to limit and fit with the second elastic member 4451. It can be understood that, as shown in FIG. 25 and FIG. 26, the second elastic member 4451 is an elastic ring with a notch, each of two ends of the elastic ring has a second stop portion 4454, and the second stop portions 4454 are fitted on the second limit member 4452 and the rear half shaft connector 421 correspondingly. Therefore, after the second switching driving member 443 is de-energized, the second elastic member 4451 may release a stored elastic force and drive the second rolling holder 442 to move relative to the rear half shaft connector 421, so that the second rolling member 441 moves from the engaged position to the disengaged position, realizing the differential locking function.

As shown in FIGS. 24 to 27, the second limit member 4452 includes a plurality of fourth protrusions 4453 peripherally spaced and extending radially outward; and the second rolling holder 442 includes a plurality of fourth grooves peripherally spaced on a side, facing the second limit member 4452, of an inner ring of the second rolling holder 442. The plurality of fourth protrusions 4453 are fitted with the plurality of fourth grooves in one-to-one correspondence. The second limit member 4452 is shaped as a sheet. The second limit member 4452 includes a third avoidance groove 4455 on its outer periphery, and the rear half shaft connector 421 includes a fourth avoidance groove 4211 at a corresponding position. The second stop portions 4454 of the second elastic member 4451 abut on corresponding side walls of the third avoidance groove 4455 and the fourth avoidance groove 4211. By providing the plurality of fourth protrusions 4453 and the plurality of fourth grooves, the second limit member 4452 and the second rolling holder 442 can realize stable peripheral limitation and be effectively spaced apart from the second switching driven member 444. Thus, the differential lock device 440 can have the compact structure and be reasonably arranged.

Specifically, when the second switching driven member 444 drives the second rolling holder 442 to move, the second limit member 4452 is driven to move, and the second limit member 4452 in turn drives one end of the second elastic member 4451 to move towards the other end of the second elastic member 4451, as shown in FIG. 21, until the second rolling member 441 moves to the engaged position, so that the second elastic member 4451 deforms to generate an elastic restoring force. After the second switching driving member 443 is de-energized, the second elastic member 4451 may release the stored elastic force, to move the second rolling member 441 from the engaged position to the disengaged position, so that the second rolling member 441 completes the switch from the disengaged position to the engaged position and again to the disengaged position, i.e., the conversion of the rear axle 400 of the vehicle from differential rotation to locked synchronous rotation, and again to the differential rotation.

Optionally, the rear axle 400 may further include a housing, and the second switching driving member 443 is fixed in the housing. In other words, the electromagnet is fixed on an inner peripheral wall of the housing, so that the electromagnet is fixed reliably, and it is convenient for the wire harness of the electromagnet to pass through the housing and be electrically coupled to the controller 600. The electromagnet is annular, and the rear half shaft connector 421 may correspondingly pass through the annular electromagnet, to prevent the electromagnet from interfering with the rotation of the rear half shaft connector 421.

Each face of the polygonal surface is a plane, and each second rolling member 441 has one disengaged position and two engaged positions, the disengaged position being located between the two engaged positions. It can be understood that when the vehicle operates in a forward gear and the differential is locked, the second rolling member 441 is fitted in one engaged position; and when the vehicle operates in a reverse gear and the differential is locked, the second rolling member 441 is fitted in the other engaged position. When the vehicle operates in the forward gear or in the reverse gear, the differential lock device 440 thus arranged may be effectively converted into a differential locking state, ensuring the formal stability of the vehicle.

The rear half shaft connector 421 is coupled to the rear shaft body, and the rear shaft body is splined to the rear half shaft connector 421. Specifically, the rear half shaft connector 421 has a shaft hole 222, an inner peripheral wall of the shaft hole 222 includes an internal spline, an inner end of the rear shaft body includes an external spline, and the internal spline is fitted with the external spline, to ensure that the rear half shaft connector 421 rotates synchronously with the rear shaft body. An outer end of the rear shaft body is coupled to the rear wheel 500.

Specifically, as shown in FIGS. 19 to 21, a fitting member 422 is fitted over an outer periphery of the rear half shaft connector 421 and is synchronously movable, and an outer peripheral surface of the fitting member 422 is the fourth contact surface. That is, the differential lock device 440 is not directly arranged on the rear half shaft connector 421, but on the fitting member 422 on the rear half shaft connector 421. By providing the fitting member 422, the modification of the rear half shaft connector 421 can be reduced, and the fitting member 422 may be reliably fitted with the engagement device 230, ensuring the reliability of the differential locking function.

The fitting member 422 is splined to the corresponding rear half shaft connector 421. It can be understood that the spline fit may allow the fitting member 422 to rotate synchronously with the corresponding rear half shaft connector 421, and the fitting mode is simple and reliable.

Optionally, the rear half shaft connector 421 includes an axial retaining ring configured to stop the fitting member 422. The axial retaining ring is located on an outer side of the fitting member 422, so that it can effectively prevent axial displacement of the fitting member 422 relative to the rear half shaft connector 421, and ensure the reliability of the fitting member 422, further ensuring the reliability of the differential locking function of the differential lock device 440.

According to an optional embodiment of the present disclosure, the controller 600 may further control the differential lock device 440 to lock the rear driven disc 410 and the corresponding rear half shaft connector 421 when a predetermined condition is met. Once locked, the two rear half shaft connectors 221 may rotate synchronously due to characteristics of the planetary gear differential mechanism. That is, when the controller 600 controls the engagement device 230 to engage the front disc body 211 and the corresponding front half shaft connector 221, the controller 600 may also synchronously control the differential lock device 440 to lock the rear disc body 411 and the corresponding rear half shaft connector 421, so that the 4WD mode and the differential locking function can be realized simultaneously, the steering reliability of the vehicle can be improved, and the vehicle may be adapted to various harsh road conditions.

The differential lock device 440 has the same structure as the engagement device 230. The first switching driving member 233 of the engagement device 230 and the second switching driving member 443 of the differential lock device 440 are electrically coupled to the controller 600, and the energized and de-energized states of the first and second switching driving members can be synchronously controlled. As a result, the differential lock device 440 and the engagement device 230 have simple structures and do not need to be designed many times, further reducing the design difficulty of the front axle 200 and the rear axle 400. Moreover, the controller 600 may simultaneously control the first switching driving member 233 of the engagement device 230 and the second switching driving member 443 of the differential lock device 440, so that the 4WD mode and the differential locking mode can be synchronously controlled, improving the reliability of the vehicle.

Figure 32:
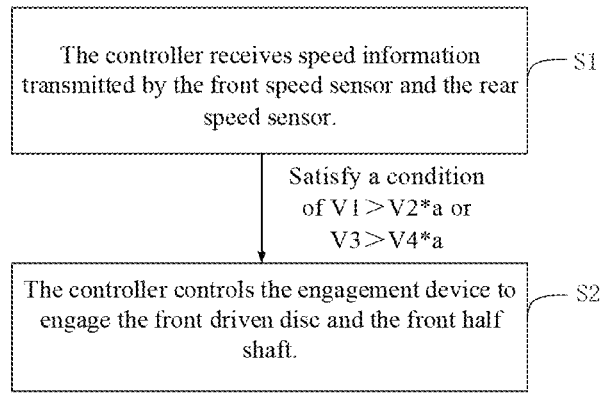
FIG. 32 is a schematic view illustrating steps of a method for driving a vehicle according to an embodiment of a present disclosure.

In a method for driving a vehicle according to the embodiments of the present disclosure, the vehicle adopts the drive system 1000 according to the above embodiments. As shown in FIG. 32, the driving method includes: receiving speed information transmitted by the front speed sensor 240 and the rear speed sensor 430; analyzing and judging whether a speed of the front wheel 300 and a speed of the rear wheel 500 meet a predetermined condition; and controlling the engagement device 230 to engage the front driven disc 210 and the front half shaft 220 by the switching driving member when the speed of the front wheel 300 and the speed of the rear wheel 500 meet the predetermined condition. By adopting the method, the vehicle may control the engagement device 230 to engage the front driven disc 210 and the front half shaft connector 221 by the controller 600 when the wheel speeds of the vehicle meet the predetermined condition, so that the driving mode of the vehicle is switched from the 2WD mode to the 4WD mode, improving the handling performance of the vehicle and the ability of driving under harsh road conditions. Therefore, the vehicle may drive more stably under t under current road conditions, damage to internal components of the vehicle can be avoided, and the service life of the vehicle can be prolonged. Moreover, the method does not require any intervention of the driver, and the controller 600 may perform the control and complete the switching process, omitting control and operation steps of the driver and reducing the operation difficulty of the vehicle.

Figure 33:
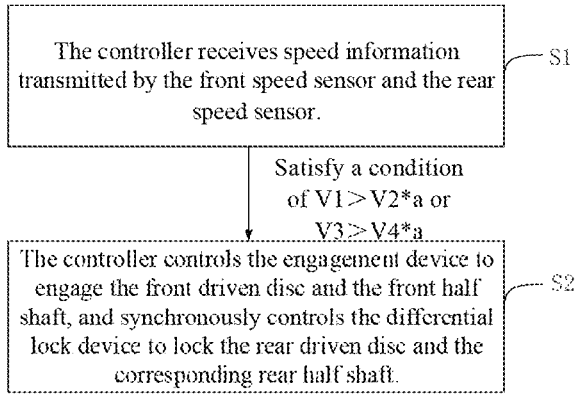
FIG. 33 is a schematic view illustrating steps of a method for driving a vehicle according to another embodiment of a present disclosure.

Optionally, as shown in FIG. 33, the method further includes: controlling the differential lock device 440 to lock the rear driven disc 410 and the corresponding rear half shaft 420 synchronously by the controller 600 when the predetermined condition is met. That is, when the controller 600 controls the engagement device 230 to engage the front disc body 211 and the corresponding front half shaft connector 221, the controller 600 may also synchronously control the differential lock device 440 to lock the rear disc body 411 and the corresponding rear half shaft connector 421, so that the 4WD mode and the differential locking function can be realized simultaneously, the steering reliability of the vehicle can be improved, and the vehicle may be adapted to various harsh road conditions.

Optionally, as shown in FIG. 32 and FIG. 33, the predetermined condition includes: V1>V2*a. The speed difference between two rear wheels 500 is V1, the turning radius speed difference between the two rear wheels 500 is V2, and the safety factor is a. That is, when the driver drives the vehicle, the controller 600 controls the vehicle to switch from the 2WD mode to the 4WD mode when the wheel running state of the vehicle meets a condition of V1>V2*a, and the controller 600 controls the vehicle to switch from the 4WD mode to the 2WD mode when the wheel running state of the vehicle meets a condition of V1<V2*a. By setting such predetermined conditions, the vehicle can be adapted to various harsh road conditions, and avoid slipping when the steering, so that the driving stability of the vehicle can be improved, the damage to the transmission system and wheels can be avoided, and the service life of the vehicle can be prolonged.

Optionally, as shown in FIG. 32 and FIG. 33, the predetermined condition includes: V3>V4*a, the speed difference between the front wheel 300 and the rear wheel 500 is V3, the average speed of the front wheel 300 and the rear wheel 500 is V4, and the safety factor is a. That is, when the driver drives the vehicle, the controller 600 controls the vehicle to switch from the 2WD mode to the 4WD mode when the wheel running state of the vehicle meets a condition of V3>V4*a, and the controller 600 controls the vehicle to switch from the 4WD mode to the 2WD mode when the wheel running state of the vehicle meets a condition of V3<V4*a. By setting such predetermined conditions, the vehicle can be adapted to various harsh road conditions, and avoid slipping when the steering, so that the driving stability of the vehicle can be improved, the damage to the transmission system and wheels can be avoided, and the service life of the vehicle can be prolonged.

A vehicle according to the embodiments of the present disclosure includes the drive system 1000 in the above embodiments.

Reference throughout this specification to "an embodiment," "some embodiments," "an exemplary embodiment," "an example," "a specific example," or "some examples," means that a particular feature, structure, material, or characteristic described in connection with the embodiment or example is included in at least one embodiment or example of the present disclosure. Thus, the exemplary descriptions of the above terms throughout this specification are not necessarily referring to the same embodiment or example.

Although embodiments of the present disclosure have been shown and described, it would be appreciated by those skilled in the art that various changes, modifications, alternatives and variations may be made in the embodiments without departing from principles and purposes of the present disclosure. The scope of the present disclosure is defined by the claims and their equivalents.

What is claimed is:

1. An axle of a vehicle, comprising:
   a driving gear;
   a driven disc comprising a driven gear meshing with the driving gear, the driven disc being hollow inside, an inner peripheral surface of the driven disc being a first contact surface, and a planetary driving gear being arranged in the driven disc;
   two half shaft connectors arranged inside the driven disc and spaced apart in an axial direction, each of the half shaft connectors comprising a planetary driven gear, the two planetary driven gears meshing with the planetary driving gear on two sides of the planetary driving gear, and an outer periphery of one of the half shaft connectors comprising a second contact surface, wherein one of the first contact surface and the second contact surface is an annular surface, and the other one of the first contact surface and the second contact surface is a polygonal surface formed by a plurality of faces connected sequentially; and
   a differential lock device comprising a plurality of rolling members, a rolling holder, a switching driving member, a switching driven member, and a second elastic reset mechanism,
   wherein the plurality of rolling members are arranged in the rolling holder and in one-to-one correspondence with the plurality of faces of the polygonal surface, and the plurality of rolling members are movable along the corresponding faces to define a disengaged position and an engaged position relative to the annular surface;
   the driven disc rotates relative to one of the half shaft connectors when the rolling members are in the disengaged position, and the driven disc and the one of the half shaft connectors rotate synchronously when the rolling members are in the engaged position;
   the switching driven member is arranged on the rolling holder, the switching driving member selectively drives the switching driven member to move the rolling holder, and the rolling members move from the disengaged position to the engaged position;

the second elastic reset mechanism returns the rolling members from the engaged position to the disengaged position;

the switching driven member comprises a main body, and a plurality of cutting portions being formed on an outer periphery of the main body and stirring air when the switching driven member rotates;

the second elastic reset mechanism comprises a second elastic member and a second limit member, the second limit member is fitted on an inner periphery of the rolling holder and rotates synchronously with the rolling holder, the second elastic member is fitted over one of the half shaft connectors, and two ends of the second elastic member are fitted on the second limit member and the one half shaft connector correspondingly.

2. The axle of the vehicle according to claim 1, wherein a fitting member is fitted over the outer periphery of the one of the half shaft connectors and is synchronously movable, and an outer peripheral surface of the fitting member is the second contact surface.

3. The axle of the vehicle according to claim 2, wherein the fitting member is splined to the corresponding half shaft connector.

4. The axle of the vehicle according to claim 2, wherein the one of the half shaft connectors comprises an axial retaining ring, and the axial retaining ring stops the fitting member.

5. The axle of the vehicle according to claim 1, wherein each face of the polygonal surface is a plane, a disengaged position and two engaged positions are defined between each rolling member and the annular surface, and the disengaged position is located between the two engaged positions.

6. The axle of the vehicle according to claim 1, wherein:
the second limit member comprises a plurality of second protrusions peripherally spaced and extending radially outward;
the rolling holder comprises a plurality of second grooves peripherally spaced on a side, facing the second limit member, of an inner ring of the rolling holder; and
the plurality of second protrusions are fitted with the plurality of second grooves in one-to-one correspondence.

7. The axle of the vehicle according to claim 6, wherein:
the second limit member is shaped as a sheet and comprises an avoidance groove on an outer periphery of the second limit member;
one of the half shaft connectors comprises another avoidance groove at a corresponding position; and
the two ends of the second elastic member abut on corresponding side walls of the avoidance groove and the another avoidance groove simultaneously.

8. The axle of the vehicle according to claim 1, wherein:
the switching driving member is an electromagnetic member, and the switching driven member is a metal member; and
the switching driving member attracts the switching driven member when the switching driving member is in an energized state, and the switching driven member drives the rolling holder to move, to allow the rolling members to move from the disengaged position to the engaged position.

9. The axle of the vehicle according to claim 8, wherein:
the switching driven member further comprises a first limit portion perpendicular to a surface of the main body, the rolling holder comprises a second limit portion on an outer side of the rolling holder, and the first limit portion and the second limit portion perform peripheral limitation; and the switching driving member is located on an outer side of the switching driven member and provides the switching driven member with a magnetic attraction force to allow the rolling holder to move in a direction opposite to a moving direction of one of the half shaft connectors, and the rolling holder drives the rolling members to rotate.

10. The axle of the vehicle according to claim 9, wherein:
the first limit portion comprises a plurality of first protrusions peripherally spaced on the switching driven member and extending towards the rolling holder;
the second limit portion comprises a plurality of first grooves peripherally spaced and arranged on a side, facing the switching driven member, of an outer ring of the rolling holder, wherein the side, facing the switching driven member, of the outer ring of the rolling holder is the outer side of the rolling holder; and
the plurality of first protrusions are fitted with the plurality of first grooves in one-to-one correspondence.

11. The axle of the vehicle according to claim 1, further comprising a housing, the switching driving member being fixed to the housing.

12. An axle of a vehicle, comprising:
a driven disc, the driven disc being hollow inside, an inner peripheral surface of the driven disc being a first contact surface, and a planetary driving gear being arranged in the driven disc;
two half shaft connectors arranged inside the driven disc and spaced apart in an axial direction, each of the half shaft connectors comprising a planetary driven gear, the two planetary driven gears meshing with the planetary driving gear on two sides of the planetary driving gear, and an outer periphery of one of the half shaft connectors comprising a second contact surface, wherein one of the first contact surface and the second contact surface is an annular surface, and the other one of the first contact surface and the second contact surface is a polygonal surface formed by a plurality of faces connected sequentially; and
a differential lock device comprising a plurality of rolling members, a rolling holder, a switching driving member, and a switching driven member,
wherein the plurality of rolling members are arranged in the rolling holder and in one-to-one correspondence with the plurality of faces of the polygonal surface, and the plurality of rolling members are movable along the corresponding faces to define a disengaged position and an engaged position relative to the annular surface;
the driven disc rotates relative to one of the half shaft connectors when the rolling members are in the disengaged position, and the driven disc and the one of the half shaft connectors rotate synchronously when the rolling members are in the engaged position;
the switching driven member is arranged on the rolling holder, the switching driving member selectively drives the switching driven member to move the rolling holder, and the rolling members move from the disengaged position to the engaged position;
the switching driven member comprises a main body, and a plurality of cutting portions being formed on an outer periphery of the main body and stirring air when the switching driven member rotates;

the axle further includes a second elastic reset mechanism, wherein the second elastic reset mechanism comprises a second elastic member and a second limit member, the second limit member is fitted on an inner periphery of the rolling holder and rotates synchronously with the rolling holder, the second elastic member is fitted over one of the half shaft connectors, and two ends of the second elastic member are fitted on the second limit member and the one half shaft connector correspondingly.

13. The axle of the vehicle according to claim 12, wherein:
the second limit member comprises a plurality of second protrusions peripherally spaced and extending radially outward;
the rolling holder comprises a plurality of second grooves peripherally spaced on a side, facing the second limit member, of an inner ring of the rolling holder; and
the plurality of second protrusions are fitted with the plurality of second grooves in one-to-one correspondence.

14. The axle of the vehicle according to claim 13, wherein:
the second limit member is shaped as a sheet and comprises an avoidance groove on an outer periphery of the second limit member;
one of the half shaft connectors comprises another avoidance groove at a corresponding position; and
the two ends of the second elastic member abut on corresponding side walls of the avoidance groove and the another avoidance groove simultaneously.

15. The axle of the vehicle according to claim 12, wherein:
the switching driving member is an electromagnetic member, and the switching driven member is a metal member; and
the switching driving member attracts the switching driven member when the switching driving member is in an energized state, and the switching driven member drives the rolling holder to move, to allow the rolling members to move from the disengaged position to the engaged position.

16. The axle of the vehicle according to claim 15, wherein:
the switching driven member further comprises a first limit portion perpendicular to a surface of the main body, the rolling holder comprises a second limit portion on an outer side of the rolling holder, and the first limit portion and the second limit portion perform peripheral limitation; and
the switching driving member is located on an outer side of the switching driven member and provides the switching driven member with a magnetic attraction force to allow the rolling holder to move in a direction opposite to a moving direction of one of the half shaft connectors, and the rolling holder drives the rolling members to rotate.

17. The axle of the vehicle according to claim 16, wherein:
the first limit portion comprises a plurality of first protrusions peripherally spaced on the switching driven member and extending towards the rolling holder;
the second limit portion comprises a plurality of first grooves peripherally spaced and arranged on a side, facing the switching driven member, of an outer ring of the rolling holder, wherein the side, facing the switching driven member, of the outer ring of the rolling holder is the outer side of the rolling holder; and
the plurality of first protrusions are fitted with the plurality of first grooves in one-to-one correspondence.

18. A vehicle, comprising an axle, wherein the axle comprises:
a driven disc, the driven disc being hollow inside, an inner peripheral surface of the driven disc being a first contact surface, and a planetary driving gear being arranged in the driven disc;
two half shaft connectors arranged inside the driven disc and spaced apart in an axial direction, each of the half shaft connectors comprising a planetary driven gear, the two planetary driven gears meshing with the planetary driving gear on two sides of the planetary driving gear, and an outer periphery of one of the half shaft connectors comprising a second contact surface, wherein one of the first contact surface and the second contact surface is an annular surface, and the other one of the first contact surface and the second contact surface is a polygonal surface formed by a plurality of faces connected sequentially; and
a differential lock device comprising a plurality of rolling members, a rolling holder, a switching driving member, and a switching driven member,
wherein the plurality of rolling members are arranged in the rolling holder and in one-to-one correspondence with the plurality of faces of the polygonal surface, and the plurality of rolling members are movable along the corresponding faces to define a disengaged position and an engaged position relative to the annular surface;
the driven disc rotates relative to one of the half shaft connectors when the rolling members are in the disengaged position, and the driven disc and the one of the half shaft connectors rotate synchronously when the rolling members are in the engaged position;
the switching driven member is arranged on the rolling holder, the switching driving member selectively drives the switching driven member to move the rolling holder, and the rolling members move from the disengaged position to the engaged position;
the switching driven member comprises a main body, and a plurality of cutting portions being formed on an outer periphery of the main body and stirring air when the switching driven member rotates;
the axle further includes a second elastic reset mechanism, wherein the second elastic reset mechanism comprises a second elastic member and a second limit member, the second limit member is fitted on an inner periphery of the rolling holder and rotates synchronously with the rolling holder, the second elastic member is fitted over one of the half shaft connectors, and two ends of the second elastic member are fitted on the second limit member and the one half shaft connector correspondingly.

* * * * *